United States Patent
Lee et al.

(10) Patent No.: US 8,559,413 B2
(45) Date of Patent: Oct. 15, 2013

(54) SYSTEM AND METHOD FOR DETECTING PACKET SYNCHRONIZATION

(75) Inventors: Gaspar Lee, Bade (TW); Hao-Jen Cheng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 12/895,757

(22) Filed: Sep. 30, 2010

(65) Prior Publication Data

US 2012/0082187 A1    Apr. 5, 2012

(51) Int. Cl.
*H04J 3/06* (2006.01)
*G01S 19/23* (2010.01)

(52) U.S. Cl.
USPC ..................................... 370/350; 342/357.62

(58) Field of Classification Search
None
See application file for complete search history.

(56) References Cited

U.S. PATENT DOCUMENTS

| | | | |
|---|---|---|---|
| 6,380,891 B1 | 4/2002 | Yamashita | |
| 6,384,775 B1 | 5/2002 | Chung | |
| 6,654,686 B2 | 11/2003 | Kimura et al. | |
| 6,775,802 B2 | 8/2004 | Gaal | |
| 6,850,557 B1 | 2/2005 | Gronemeyer | |
| 2005/0174284 A1* | 8/2005 | Abraham et al. | 342/357.09 |
| 2008/0143594 A1* | 6/2008 | Wang et al. | 342/357.12 |
| 2008/0165057 A1* | 7/2008 | Li et al. | 342/357.15 |
| 2009/0021427 A1* | 1/2009 | Tsai | 342/357.12 |
| 2012/0050096 A1* | 3/2012 | Cheng et al. | 342/357.25 |
| 2012/0051402 A1* | 3/2012 | Cheng et al. | 375/148 |

OTHER PUBLICATIONS

International Search Report and Written Opinion—PCT/US2011/051632—ISA/EPO—Jan. 6, 2012.

* cited by examiner

*Primary Examiner* — Steven H Nguyen
(74) *Attorney, Agent, or Firm* — Bever, Hoffman & Harms, LLP

(57) ABSTRACT

A method of providing frame synchronization for GPS signals can include performing coherent bit extraction on the GPS bits and then performing coherent frame boundary detection based on the bits of the coherent bit extraction. Concurrently, differential bit extraction on the GPS bits and differential frame boundary detection based on bits of the differential bit extraction can be performed. Whichever of the coherent frame boundary detection and the differential frame boundary detection first finds a frame boundary, then that frame boundary is used for the frame synchronization. A method of providing string synchronization for GLONASS signals includes performing coherent and differential bit extraction on the GLONASS bits.

25 Claims, 17 Drawing Sheets

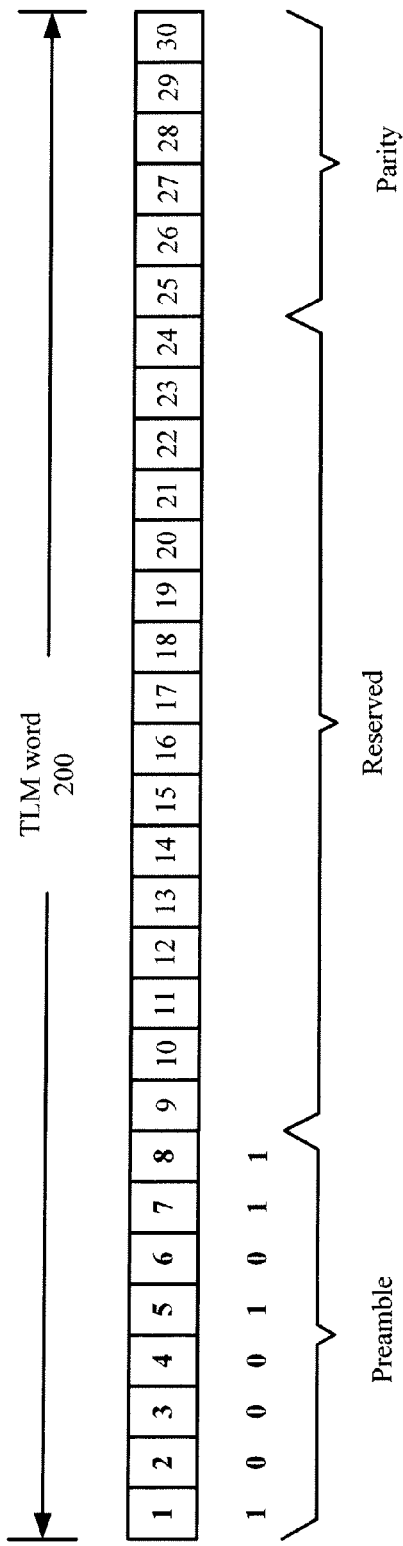
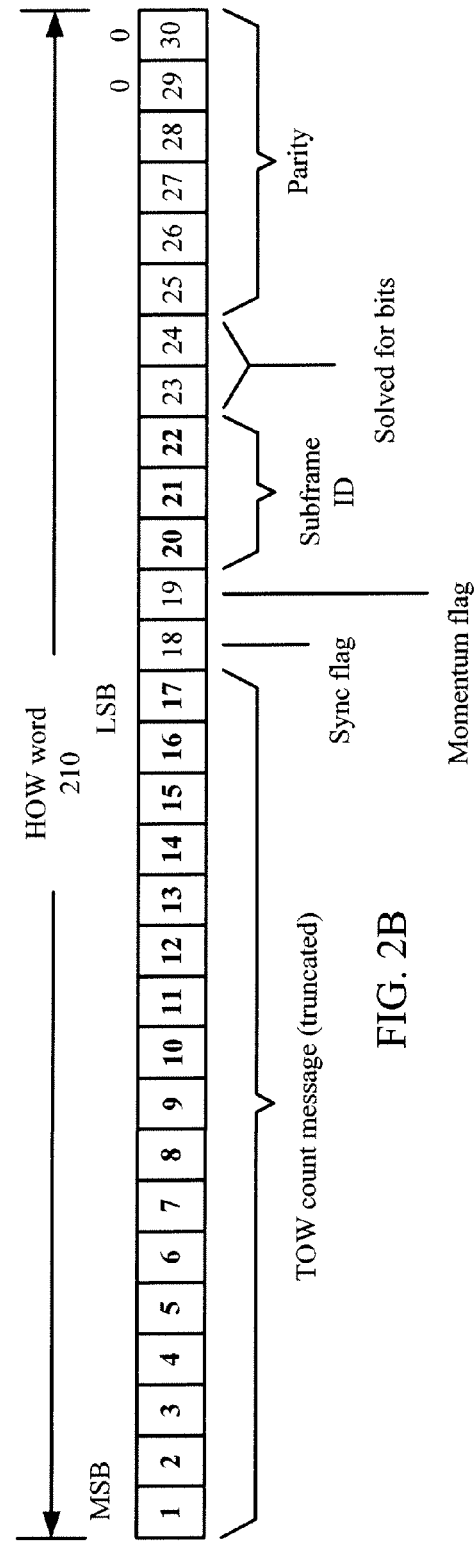
FIG. 2A
FIG. 2B

SYSTEM AND METHOD FOR DETECTING PACKET SYNCHRONIZATION

BACKGROUND OF THE INVENTION

1. Field of the Invention

The present invention relates to the detection of packet synchronization of signals from radio-based satellite systems and specifically to GPS frame synchronization and GLONASS string synchronization.

2. Related Art

GPS (global positioning system) and GLONASS (global navigation satellite system) are radio-based satellite systems in operation today. To provide global coverage, GPS uses between 24-32 satellites. Assuming the minimum number of 24 satellites, 4 satellites are deployed in each of six orbits. The six orbital planes' ascending nodes are separated by 60 degrees. In this configuration, a minimum of six satellites should be in view from any given point at any time. To provide global coverage, GLONASS includes 24 satellites, wherein 21 satellites can be used for transmitting signals and 3 satellites can be used as spares. The 24 satellites are deployed in three orbits, each orbit having 8 satellites. The three orbital planes' ascending nodes are separated by 120 degrees. In this configuration, a minimum of five satellites should be in view from any given point at any time.

Both GPS and GLONASS broadcast two signals: a coarse acquisition (C/A code) signal and a precision (P code) signal. In general, global position devices, called receivers herein, lock onto the C/A transmission and not the P transmission. The P transmission is much longer than the C/A transmission and therefore is impractical to lock onto, e.g. by using synchronization. Once a lock is established via C/A transmission, the C/A transmission itself can provide a quick P lock.

The C/A codes for GPS and GLONASS, which can be generated as a modulo-2 sum of two maximum length shift register sequences, are selected for good cross-correlation properties. Each GPS satellite transmits its own unique C/A code, which has an identifiable pseudo-random noise code number (PRN#). In contrast, each GLONASS satellite transmits the same C/A code, and is identified by its channel number (CHN#).

The C/A code includes navigation data, which provides information about the exact location of the satellite, the offset and drift of its on-board atomic clock, and information about other satellites in the system. In GPS, the C/A format for the navigation data includes words, frames, and subframes. The words are 30 bits long; ten words form one subframe; and five subframes form one frame. In GPS, the C/A code is 1023 bits long, is transmitted at 1.023 Mbps, and therefore has a repetition period of 1 ms. In GLONASS, the C/A format is strings, wherein each string includes 1.7 sec of navigation data and 0.3 sec of a time mark sequence. Notably, the C/A code in GLONASS is 511 bits long, is transmitted at 511 kbps, and therefore has the same code repetition period (i.e. 1 ms) as GPS.

With the advent of GLONASS satellites now being available to provide position information, it is desirable to have a system that includes the capability of using both GPS and GLONASS signals for position determination. Therefore, a need arises for synchronizing to both GPS and GLONASS signals.

SUMMARY OF THE INVENTION

A method of providing frame synchronization for GPS signals is described. The method can include performing coherent bit extraction on the GPS bits and then performing coherent frame boundary detection based on the bits of the coherent bit extraction. Concurrently, differential bit extraction on the GPS bits and differential frame boundary detection based on bits of the differential bit extraction can be performed. Whichever of the coherent frame boundary detection and the differential frame boundary detection first finds a frame boundary, then that frame boundary is used for the frame synchronization.

In one embodiment, performing the coherent bit extraction on the GPS bits can include finding a preamble of a first telemetry (TLM) word of a first GPS subframe, parity bits of the first TLM word and a first hand over word (HOW) word, a time of week (TOW) of the first HOW word, and subframe ID bits of the first HOW word. Performing the coherent frame boundary detection can include checking the validity of the first TLM word and the first HOW word using their parity bits and declaring a TOW synchronization when a valid first HOW word follows a valid first TLM word.

Performing the coherent bit extraction on the GPS bits can further include finding a preamble of a second TLM word of a second GPS subframe, parity bits of the second TLM word and a HOW word of the second GPS subframe, a TOW of the second HOW word, and subframe ID bits of the second HOW word. Performing the coherent frame boundary detection can further include checking the validity of the second TLM word and the second HOW word using their parity bits. A detected frame boundary can be declared when (1) a valid second HOW word follows a valid second TLM word, (2) the second TOW is equal to the first TOW +1, and (3) when the second subframe ID bits equal the first subframe ID bits +1.

In one embodiment, coherent and differential boundary detection are only performed once two words are stored. The method can use a sliding window for the two words, wherein a first-in GPS bit of the two words can be deleted and a new GPS bit can be added as a last-in GPS bit of the two words. Performing coherent and differential bit extraction on GPS bits as well as coherent and differential frame boundary detection can be repeated as necessary until the GPS frame boundary is detected.

Performing the differential bit extraction on the GPS bits can include finding a preamble of a telemetry (TLM) word of a GPS subframe, and a limited number of most significant bits (MSB) of a time of week (STOW) of a hand-over word (HOW) word. Performing the differential frame boundary detection can include identifying the TLM word using the preamble. At this point, a limited number of survivor paths can be saved, wherein survivor paths are the most likely locations for the frame boundary. In one embodiment, the limited number of survivor paths is 10-12 locations out of a possible 300 locations.

When performing the differential frame boundary detection, multiple TLM and HOW words can be used. Therefore, the survivor paths can be updated to reflect the most likely locations for the frame boundary. In one embodiment, a +1 can be added to a metric each time a TLM word is identified using the preamble. A value of a last STOW can be stored, and a STOW flag can be set to ON when a current STOW equals the last STOW. A detected frame boundary can be declared when (1) the metric is greater than or equal to a threshold and the STOW flag is set to ON. In one embodiment, the threshold can be a function of time. For example, the threshold can be increased by "1" every 10 ms.

A method of providing string synchronization for GLONASS signals is also provided. This method includes performing coherent and differential bit extraction on the GLONASS bits. In one embodiment, for both coherent and differential bit extraction, 30 bits can be extracted every 10 ms. String boundary detection based on bits of the coherent bit extraction can then be concurrently performed in both coherent and differential modes. Whichever of the coherent string boundary detection and the differential string boundary detection first finds a string boundary, that string boundary is used for the string synchronization.

Performing coherent string boundary detection can include correlating the 30 bits with a time mark of GLONASS without bit flipping. A metric for each correlation output value can then be assigned based on the correlation. In one embodiment, the metric can be accumulated for each bit location every 2 seconds. A limited number of survivor paths, e.g. 8 survivor paths, can be identified based on the highest accumulated metrics. The survivor paths can be updated as necessary for each extracted sequence. A determination can then be made whether a set of accumulated metrics is greater than or equal to a threshold, and if so, then declaring a time mark boundary detection. Notably, time mark boundary detection can provide the string synchronization.

Performing differential bit extraction on the GLONASS bits can also include extracting 30 bits every 10 ms. The steps for performing differential string boundary detection are similar to those described for coherent string boundary detection; however, the correlation of the 30 bit with the time mark can be performed with bit flipping. In one embodiment, the thresholds for the differential string boundary detection and the coherent string boundary detection are different.

A computer-readable storage device is also described. This storage device can include instructions, which when executed by a computer, can perform the above-described steps for providing frame/string synchronization for GPS/GLONASS signals.

BRIEF DESCRIPTION OF THE DRAWINGS

FIG. 2A illustrates the structure of a TLM (telemetry) word, which is the first word in a subframe.

FIG. 2B illustrates the structure of a HOW (hand-over word), which is the second word in a subframe.

DETAILED DESCRIPTION OF THE DRAWINGS

Figure 1:
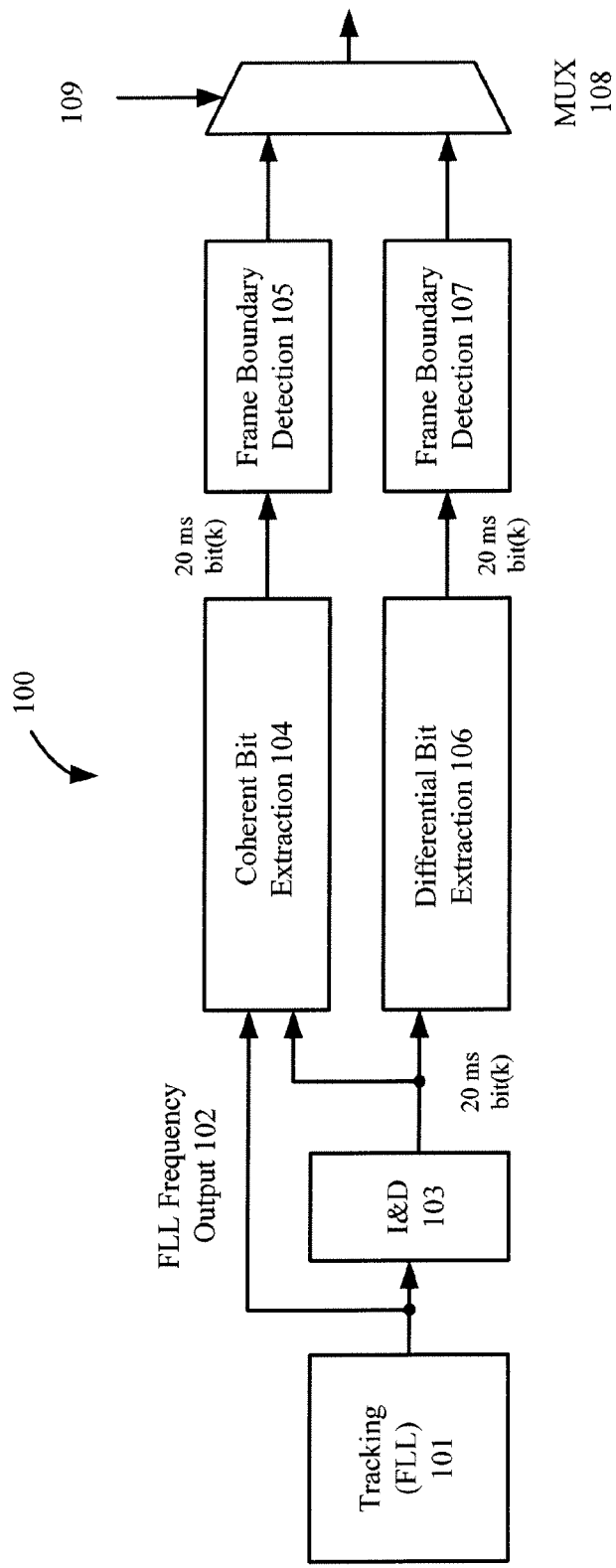
FIG. 1 illustrates an exemplary GPS frame boundary detection system that can perform hybrid bit extraction, i.e. using both coherent bit extraction and differential bit extraction, for detecting a frame boundary.

FIG. 1 illustrates an exemplary GPS frame boundary detection system 100 that can perform hybrid bit extraction, i.e. using both coherent bit extraction and differential bit extraction. In this embodiment, a tracking block using a frequency lock loop (FLL) 101 can output an FLL frequency output 102. An integrated and dump (I&D) block 103 can integrated a predetermined number of FLL frequency outputs 102 and then generate an output. In one embodiment, I&D block 103 can implement a 20:1 integrated and dump process. A coherent bit extraction block 104 can receive FLL frequency output 102 as well as the output of I&D block 103. A differential bit extraction block 106 can receive just the output of I&D block 103. Frame boundary detection blocks 105 and 107 can receive the outputs of coherent bit extraction block 104 and differential bit extraction block 106, respectively. A multiplexer 108 can be used to select one of the outputs of frame boundary detection blocks 105 and 107. In one embodiment, a control signal 109 selects whichever frame boundary detection block first generates a FRAME sync signal. As described in further detail herein, the coherent bit extraction associated with frame boundary detection 105 can provide high dynamic detection, whereas the differential bit extraction associated with frame boundary detection 107 can provide high sensitivity detection. As shown in FIG. 1, both differential and coherent paths perform the same frame synchronization procedure in GPS. Note that both the differential and coherent methods have high and low threshold paths.

Bit extraction, whether coherent or differential, is dependent on certain functional aspects of a GPS frame. A GPS frame consists of 5 subframes, the first three of which are ephemeris data. Each subframe has 10 words, wherein each word has 30 bits including 6 parity check bits. In order to extract the ephemeris data correctly, the start position of each subframe must be found. As described in further detail below, specific bits in the first and second words of a subframe can be used for frame boundary detection.

FIG. 2A illustrates the structure of a TLM (telemetry) word 200, which is the first word in a subframe. TLM word 200 has an 8-bit preamble (1-8), 16 reserved bits (9-24), and 6 parity bits (25-30). In one embodiment, the 8-bit preamble can be used for frame boundary detection. Notably, the 8-bit preamble is fixed, the bits being "10001011".

FIG. 2B illustrates the structure of a HOW (hand-over word) 210, which is the second word in a subframe. HOW word 210 has 17 bits of TOW (time of week)(1-17)(MSB (most significant bits) on left and LSB (least significant bits) on right), two flag bits (18-19)(18: a sync flag for configuration 000 and an anti-spoof flag for configuration 001)(19: a momentum flag for configuration 000 and an alert flag for configuration 001), and 3 subframe ID bits (20-22), and 6 parity bits (25-30). In one embodiment, the TOW bits and the subframe ID bits can be used for frame boundary detection.

Figure 3:
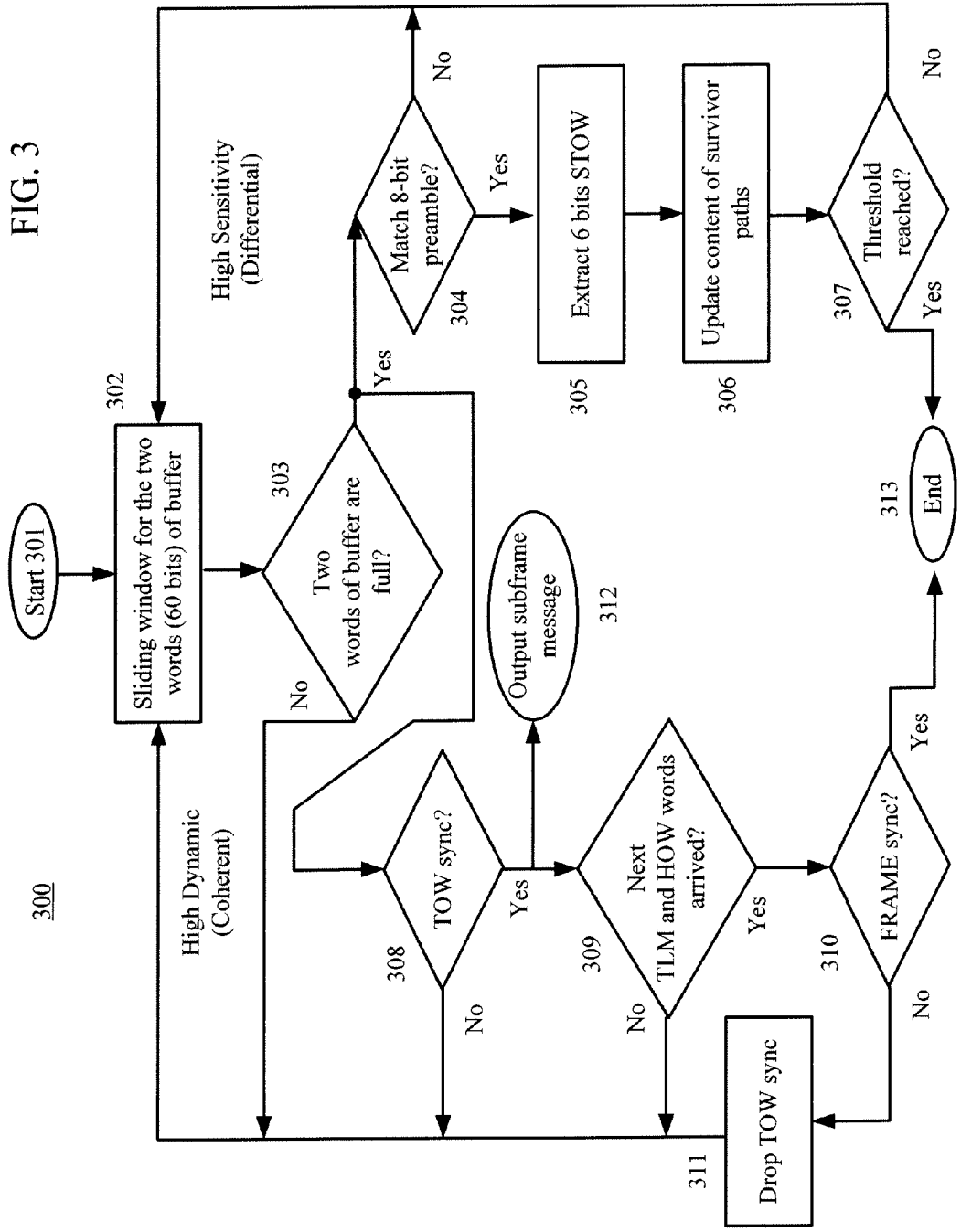
FIG. 3 illustrates an exemplary technique using the above-described subset of the TLM and HOW bits for frame synchronization (sync).

FIG. 3 illustrates an exemplary technique 300 using the above-described subset of the TLM and HOW bits for frame synchronization (sync). In technique 300, after starting in step 301, a sliding window for two words (i.e. 60 bits long) can be used to fill a buffer (e.g. a FIFO (first-in-first-out)) in step 302. Once the buffer is full, as indicated by step 303, two sets of steps can operate concurrently. A first set of steps, i.e. steps 308-310, can use a high threshold with a short estimation period, which provides quick detection for high SNR (signal to noise ratio). This set of steps can also be characterized as the high dynamic detection described for coherent extraction. A second set of steps, i.e. steps 304-307, can use a low threshold with a long estimation period for low SNR. Notably, the two sets of steps can operate concurrently until one of them detects and verifies the subframe boundary.

In step 308, a TLM word can be identified by finding the fixed preamble. The validity of the TLM word can be checked using the parity bits. When a valid HOW word (as determined by its parity bits) follows the identified, valid TLM word, then a TOW sync condition can be declared. At this point, data extraction can begin (triggered by an output subframe message 312). In one embodiment, the TOW bits and subframe ID bits of the HOW word can be extracted in step 308 (wherein D29 and D30 of the HOW word will always be zero). Note that if a TOW sync is not found, then technique returns to step 302 for the next bit to re-do the TOW sync tests.

Step 309 determines when the next TLM and HOW words have arrived. If the next TLM and HOW words have not arrived, then technique 300 returns to step 302 for the next bit. After arrival, these new TLM and HOW words can also be identified and validated (i.e. essentially confirming a TOW sync condition of the newly-arrived TLM and HOW words). Notably, if the extracted TOW and subframe ID (SID) of the newly-arrived TOW and HOW words are equal to TOW_old+1 and SID_old+1, then a FRAME sync condition can be declared in step 310. That is, the TOW (a truncated Z-count) and the SID must increment by one.

If not, then the TOW sync condition is dropped in step 311 and the TOW sync is redone, i.e. the TOW sync conditions can be checked at incoming bits (every 20 ms). At this point, technique 300 returns to step 302. In one embodiment, a verified FRAME sync (end step 313) is not dropped unless the GML detects a missed correlator interrupt, or if buffer overflow between data demodulation and subframe handling is detected.

As indicated above, when the buffer is full (as determined by step 303), steps 304-306 (corresponding to the low threshold with the long estimation period) operate concurrently with steps 308-310. Steps 304-306 are particularly useful when signal power is low, thereby reducing the probability of passing the above-described criteria for both the TLM and HOW words. As described in further detail below, these steps can use fewer bits of the HOW word (hence the "low" threshold) for a frame sync determination.

Step 304 (like step 308) can identify a TLM word using the fixed, 8-bit preamble. If the TLM word is not found, then technique 300 returns to step 302 for the next bit to be loaded in the buffer. After finding the preamble, step 305 can extract the first 6 bits (i.e. of the MSB) of the 17-bit TOW (called STOW (short TOW) hereafter). Note that the STOW does not change within 3.4 hours and therefore can be considered as a constant during the detection process. (Moreover, if the detection process does happen to cross a STOW transition, only bit 6 is affected, which is acceptable.)

After extraction, step 306 can update the contents of the survivor paths. The survivor paths are the potential frame sync locations kept in memory for continuing verifications. Each of these survivor paths can include a bit index (0~299, i.e. wherein each subframe has 300 bits), a summation of the metrics (described below), the latest STOW, and a flag of a verified STOW (e.g. setting the flag ON if the new STOW is equal to the previous STOW).

In one embodiment, the metric can be increased by "1" each time the 8-bit preamble is matched. If the summation of the metrics is greater than or equal to a threshold and the flag of the verified STOW is ON, then the FRAME sync condition is declared and technique 300 ends in step 313. In one embodiment, the threshold can be a function of time, and can be increased by "1" every 10 sec. For example, the threshold may be set to 3 for time less than 40 seconds, set to 4 for time between 40 and 50 seconds, and set to 5 for time between 50 and 60 seconds. This corresponds to the following relationship: threshold=max(3, floor(time/10))(where a generic max (A,B) operation selects the bigger of A and B, and a generic floor (C) operation takes the integer part of C).

Figure 4:
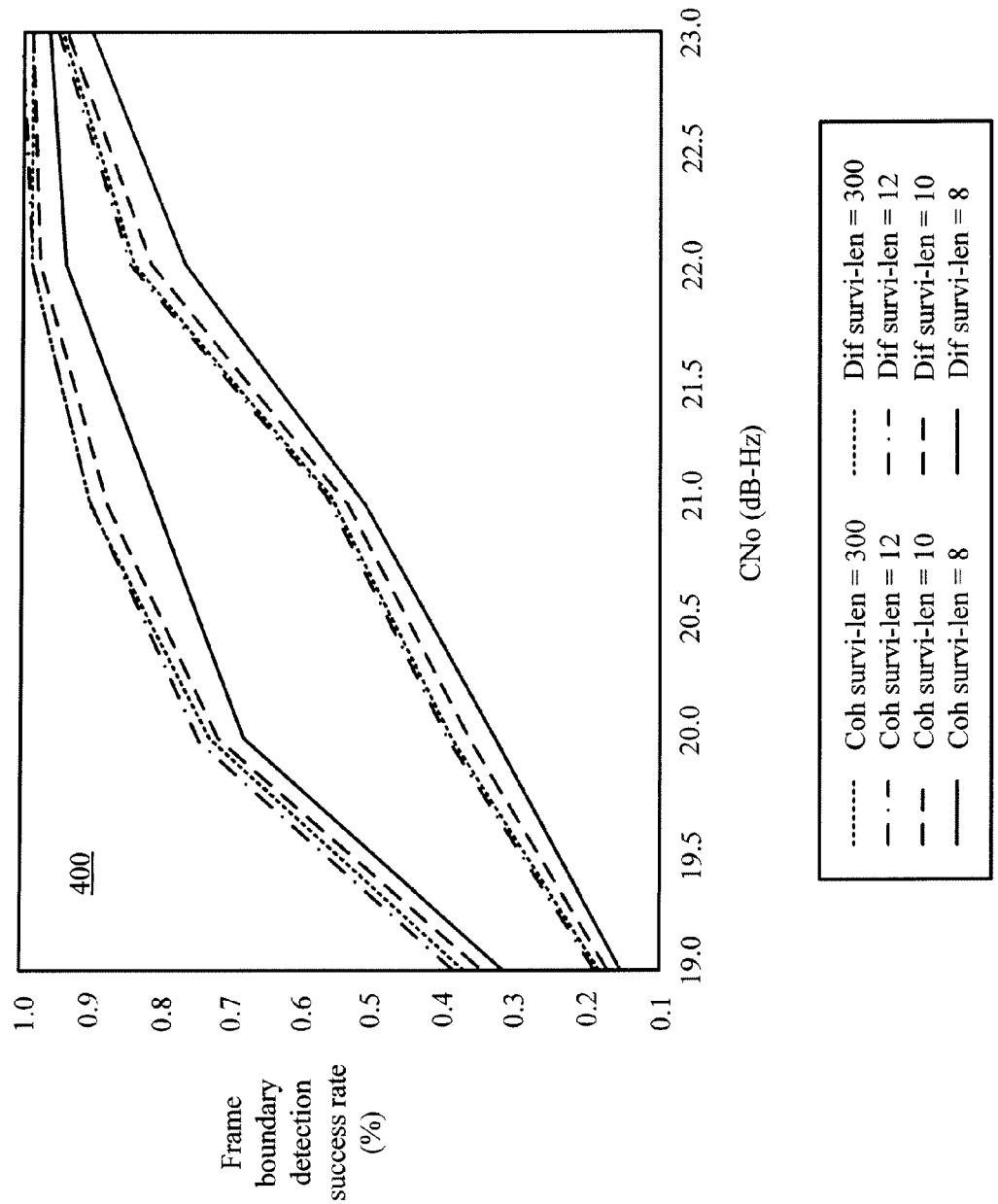
FIG. 4 illustrates a graph showing the performance for different numbers of survivor paths for coherent and differential bit detection.

FIG. 4 illustrates a graph 400 showing the performance for different numbers of survivor paths for coherent and differential bit detection. An ideal case is 300, which means all possible cases are saved. One commercially viable number is 12 or 10, which reduces the complexity significantly with minor loss (less than 0.1 dB). In this case, only the first 12 or 10 occurrences of preamble matches are recorded and checked.

Figure 5:
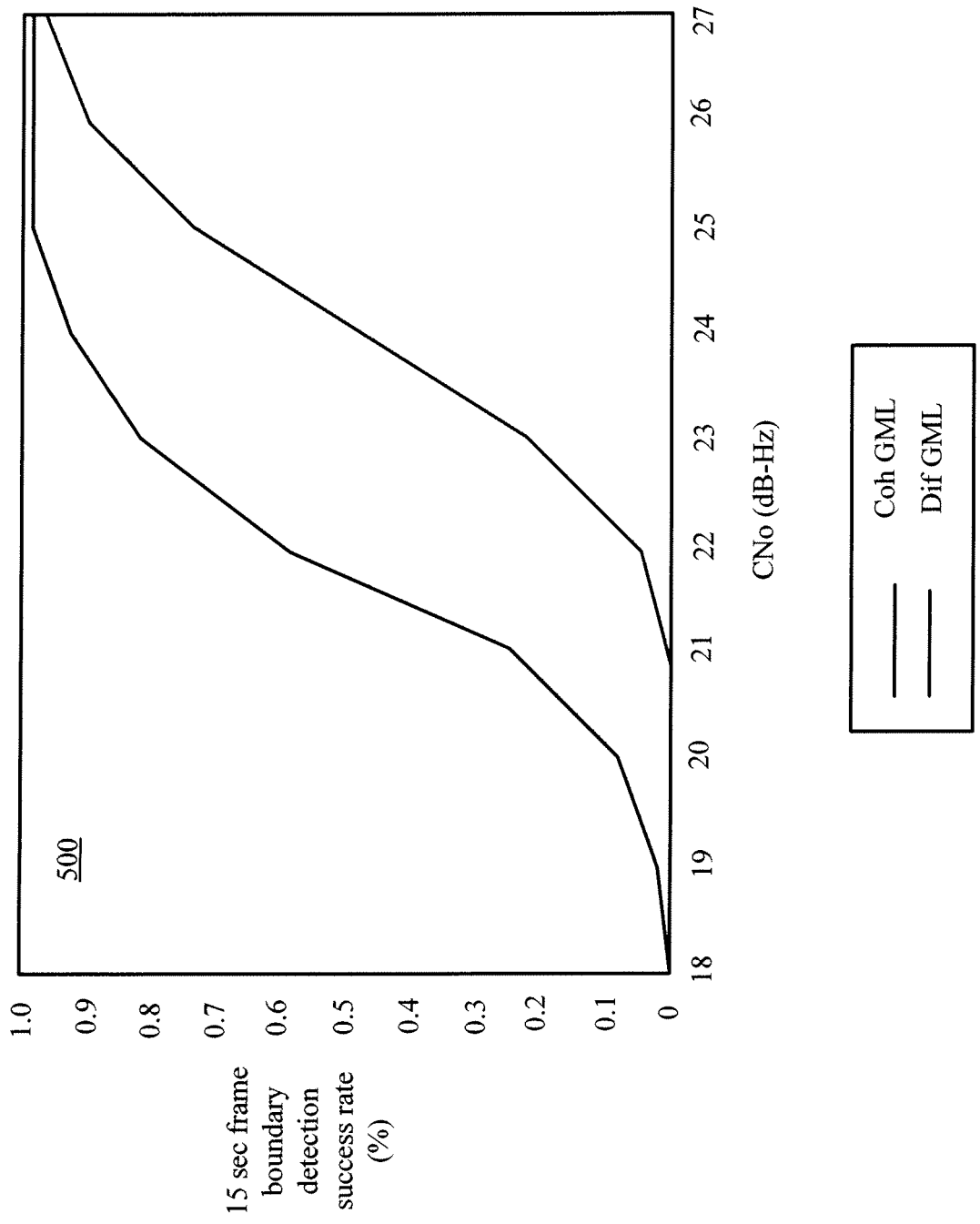
FIG. 5 illustrates a graph showing an exemplary GPS frame boundary detection success rate given a timeout of 15 seconds.
Figure 6:
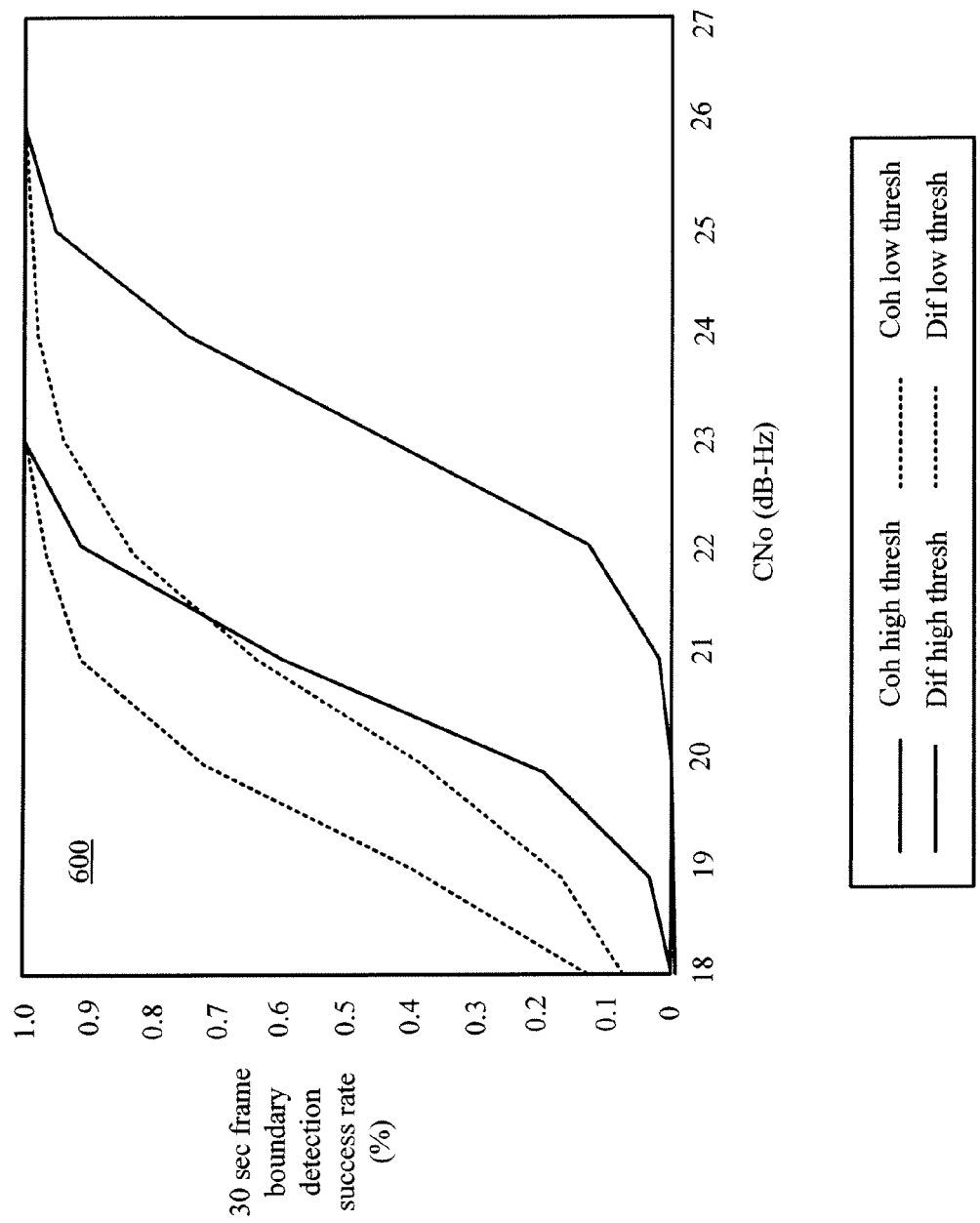
FIG. 6 illustrates a graph showing an exemplary GPS frame boundary detection success rate given a timeout of 30 seconds.
Figure 7:
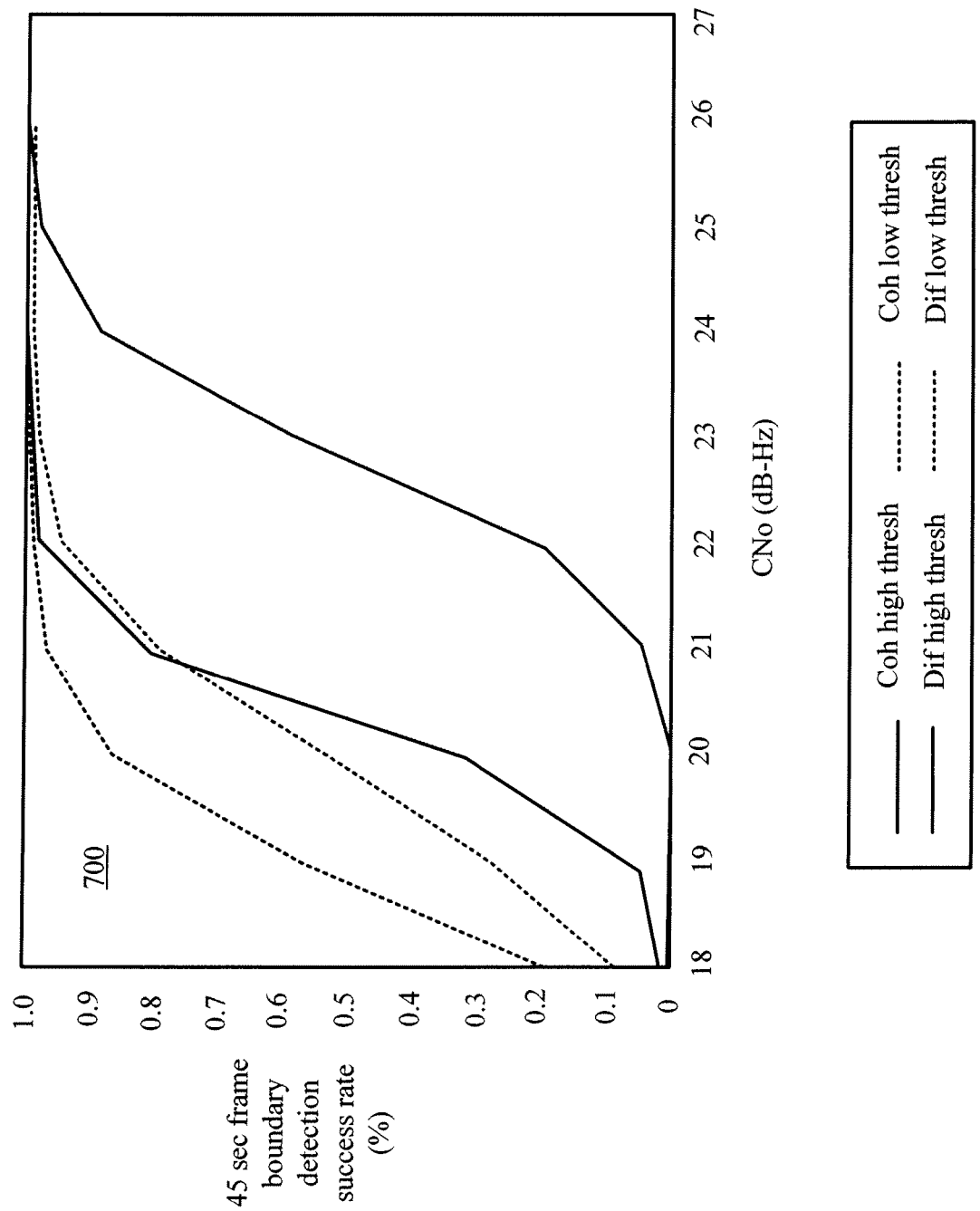
FIG. 7 illustrates a graph showing an exemplary GPS frame boundary detection success rate given a timeout of 45 seconds.

FIG. 5 illustrates a graph 500 showing an exemplary GPS frame boundary detection success rate given a timeout of 15 seconds. FIG. 6 illustrates a graph 600 showing an exemplary GPS frame boundary detection success rate given a timeout of 30 seconds. FIG. 7 illustrates a graph 700 showing an exemplary GPS frame boundary detection success rate given a timeout of 45 seconds. Note that for the simulations to generate graphs 500, 600, and 700, frame boundary detection probability is simulated every 1500 bits (30 sec). NB=3 and PH=1 are chosen as the coherent bit extraction parameter settings and a 10 Hz/sec Doppler slope as the default impairment. The probability is calculated from 10000 times simulation. Parameters for the case of low threshold are as follows: threshold=max(3, floor(time/10)) and number of survivor paths is 12. Table 1 indicates a performance summary for the GPS frame detection results shown in FIGS. 5, 6, and 7.

TABLE 1

Performance Summary for the GPS Frame Detection

| Method | CNo (dB-Hz) | False alarm rate (max) | Improvement (dB) |
|---|---|---|---|
| The required CNo for 90% frame boundary detection rate given a timeout = 15 sec (GPS) | | | |
| Diff w/high threshold | 26.0 | 0 | 0 |
| Coherent w/ high threshold | 23.7 | 0 | 2.3 |

TABLE 1-continued

Performance Summary for the GPS Frame Detection

| Method | CNo (dB-Hz) | False alarm rate (max) | Improvement (dB) |
|---|---|---|---|
| The required CNo for 90% frame boundary detection rate given a timeout = 30 sec (GPS) | | | |
| Diff w/high threshold | 24.7 | 0 | 0 |
| Coherent w/ high threshold | 22 | 0 | 2.7 |
| Diff w/low threshold | 22.6 | 2e−3 | 2.1 |
| Coherent w/ low threshold | 21.0 | 2e−3 | 3.7 |
| The required CNo for 90% frame boundary detection rate given a timeout = 45 sec (GPS) | | | |
| Diff w/high threshold | 24.1 | 0 | 0 |
| Coherent w/ high threshold | 21.5 | 0 | 2.6 |
| Diff w/low threshold | 21.6 | 2e−3 | 2.5 |
| Coherent w/ low threshold | 20.4 | 2e−3 | 3.7 |

String boundary detection for GLONASS signals can also use concurrent coherent and differential bit extraction, as described in detail below. However, for GLONASS signals, the time mark bits are used for synchronization.

Figure 8:
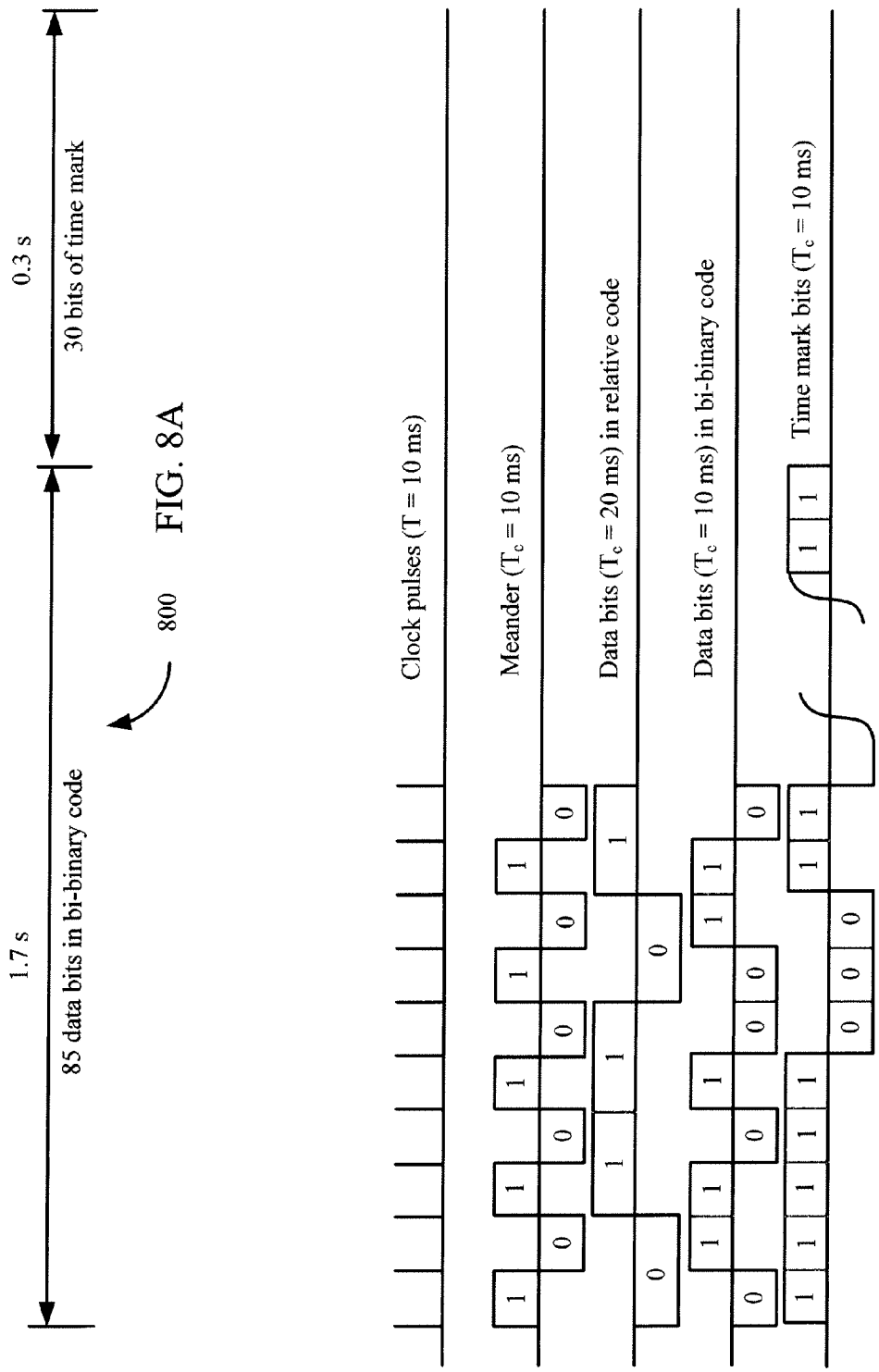
FIG. 8A illustrates a GLONASS string 800 including 85 data bits in bi-binary code and 30 bits of time mark.
FIG. 8B shows the 85 data bits in both relative code and in bi-binary code based on modulation by a meander sequence (which changes polarity every 10 ms).

FIG. 8A illustrates a GLONASS string 800 including 85 data bits in bi-binary code and 30 bits of time mark. FIG. 8B shows the 85 data bits in both relative code and in bi-binary code based on modulation by a meander sequence (which changes polarity every 10 ms). Therefore, these 85 bits in bi-binary code are encoded.

FIG. 8B shows the 30 bits of time mark aligned with the 85 data bits for comparison. As shown, each of the 30 time mark bits is 10 ms long. The time mark is provided to facilitate time synchronization of the satellite's atomic clock to the receiver's local clock. To this end, the time mark is a fixed pattern that repeats every 2 sec. The goal of time mark detection is to find the string boundary and to remove the 10 ms bit transitions caused by the time mark sequence and the meander sequence. In one conventional technique, all 30 bits are matched to trigger string boundary sync. This technique can be achieved only for high SNR signals. Notably, imperfect correlation output (i.e. less than 30/30) can also provide valuable information, which can accurately trigger string boundary sync.

Figure 9:
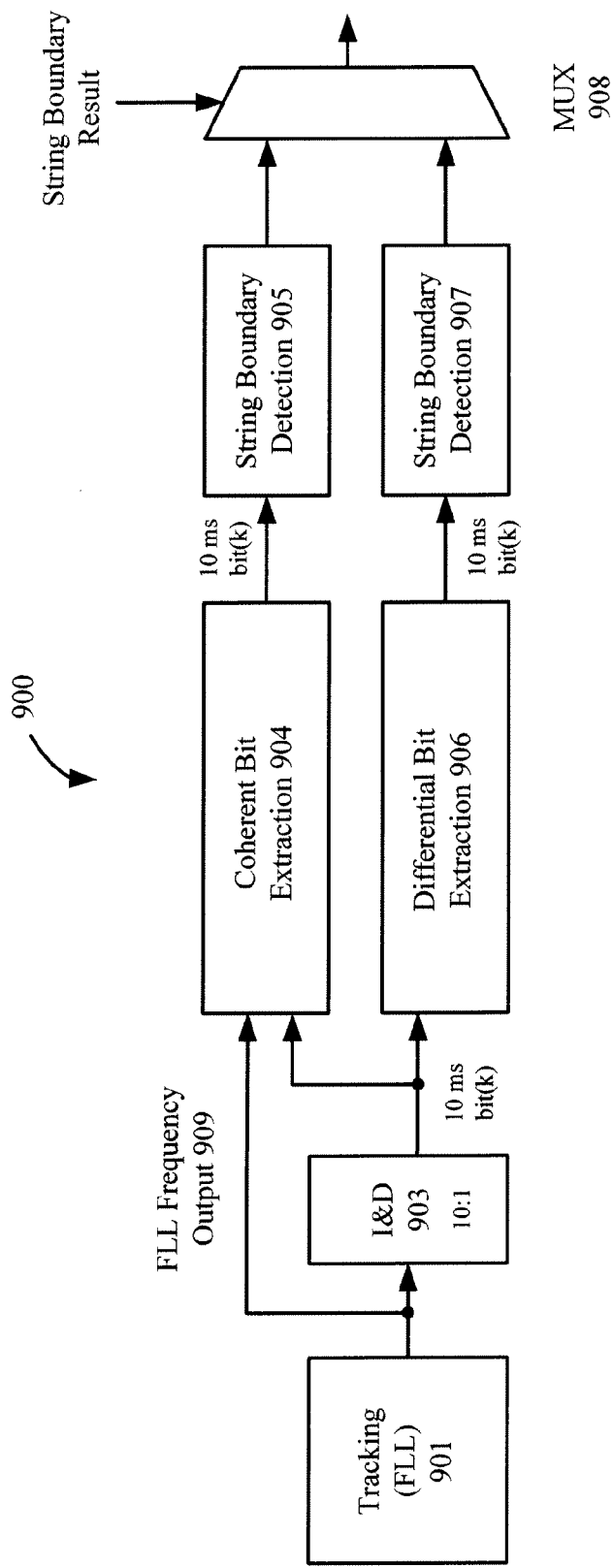
FIG. 9 illustrates a block diagram of an exemplary GLONASS string boundary detection system.

FIG. 9 illustrates a block diagram of an exemplary GLONASS string boundary detection system 900. In this simplified block diagram, system 900 includes a frequency lock loop (FLL) block 901, an integrate and dump (I&D) block 902, a coherent detection system 903, a differential detection system 904, parity check blocks 905, 906, and a multiplexer (MUX) 907. In this embodiment, coherent detection system 903 can receive a frequency output $f_{FLL}$, which is generated by FLL 901. In contrast, differential detection system 904 can receive an output of I&D block 902, which can generate its output every 10 ms (upon receiving prompts every 1 ms from FLL 901 and integrating such signals). String boundary detection blocks 905 and 906 receive outputs of coherent detection block 903 and differential detection system 904, respectively. Multiplexer 907 selects between the outputs of string boundary detection block 905 and string boundary detection block 906 based on a string boundary result signal.

In one embodiment, time mark detection can include a hybrid bit extraction, i.e. both coherent and differential, with a bit duration of 10 ms. As described in detail below, performance enhancements can include bit flipping, soft metrics, and 20 ms bit boundary assistance.

Bit phase reversal, called bit flipping herein, in a received GLONASS signal can frequently occur because of noise. Bit phase reversal can cause severe problem for matching the received bits with the fixed time mark pattern, especially for differential detection mode. Note that if one bit flips, then the remainder of the 30 bits would be flipped. Thus, when bit phase reversal occurs within the time mark, the correlation between the received time mark and the desired time mark may be quite low or even zero. For example, if the phase reversal occurs in the middle of the time mark sequence, then the correlation is zero.

In accordance with one time mark detection technique, a correlation (matching) can be computed for the received sequence as well as the bit flipped versions of it. For a hypothetical segment, bit[0:29], bit[n:29] can be flipped, where n=0-29, to compute 30 different correlations, and then the best match is chosen. Note "n=0" is equivalent to no flipping. In one embodiment, the gain from bit flipping is around 0.3 and 2 dB for coherent and differential detection, respectively. However, bit flipping can increase the false alarm rate of time mark detection. Therefore, in one embodiment, bit flipping can be used only for differential detection to balance the false alarm and detection rate.

Note that according to the GLONASS ICD (interface control document) the first bit of a string is always zero, which extends the time mark from 30 bits to a full 31 bits or 32 bits. Thus, the algorithms described below that refer to 30-bit correlation are equally applicable to 31-bit or 32-bit correlations.

As indicated above, string sync detection can be performed after the 10 ms bit boundary is detected. Because each GLONASS string is 2 sec long, there are 200 (i.e. 2/0.01) possible locations of the string boundary. One basic algorithm picks the location with the highest matching score over 2 sec, and then verifies the matching at the same position 2 sec later.

To improve the detection probability, a soft metric can be adopted, wherein the soft metric can be accumulated for each position over multiple strings and the best position can be chosen based on the accumulated metric. Doing that for all positions would require 200 accumulators. To reduce complexity, a limited number of survivors, i.e. the positions with the largest accumulated metrics, can be kept. In one embodiment, 8 survivors output of the 200 bit locations can be kept.

In one embodiment, a sum of logarithms can be used to compute the soft metrics. The soft metrics can be developed as follows:

First, a single point false alarm probability of having n bits out of any N-bit segment of a random sequence match the time mark sequence, P(n/N) can be derived. In this case, N is the number of bits used for the time mark correlation, e.g. N=30, and thus n=30, 29, 28 and so on. In one embodiment, N can be user selected. In other embodiments, N can be set in the GLONASS receiver.

For coherent mode (which is without bit flipping):

$$P(n/N)_{coh} = C_N^{N-n} \times 2 \times 2^{-N}$$

where $C_N^{N-n}$ is the binomial coefficient. Note that a factor of 2 can be used because the polarity of the correlation can be ignored. For example, the random bit false alarm probability of $P(29/30)_{coh}$ (i.e. having 29 bits of a 30-bit random sequence matching the time mark) is equal to $C_{30}^1 \times 2 \times 2^{-30} \approx 5.50 \times 10^{-8}$.

For differential mode (which includes bit flipping), the probability of flipping bits and selecting the maximum can be modeled by curve fitting a differential single point probability P from simulations as follows:

$$P(n/N)_{diff} = P(n/N)_{coh} \times (N - 3*(N-n))$$

For a position m, the number of bit matches n(m) can be found, and the corresponding false alarm rate, q(m)=p(n(m)/N) can be obtained. The false alarm probability evaluated over multiple strings for position m, where m=0~199, is then:

$$P(m) = q(m)*q(m+200)*q(m+400)* \ldots$$

wherein the lowest P(m) corresponds to the most likely string boundary.

The product of probabilities can be simplified by the sum of the logarithm of the probabilities Lp(n). For example, let $Lp(n) = -\log 10(p(n))$, and define metric(m)=$-\log 10(P(m))$ = $(-\log 10(q(m))) + (-\log 10(q(m+200))) + (-\log 10(q(m+400))) + \ldots = Lp(n(m)) + Lp(n(m+200)) + Lp(n(m+400)) + \ldots$, then the largest metric(m) corresponds to the most likely string boundary.

Table 2 is a log-metric table for coherent and differential string boundary detection, i.e. without and with bit flipping. The logarithm of probability Lp(n) in Table 2 can be derived by:
1. Choosing a normalization factor nor_fac=3.5e-2
2. Computing a logarithm: $Lp(n) = -\log 10(p(n/N)/nor\_fac)$
3. Rounding the logarithm: $Lp(n) = round(Lp(n)*100)/100$
4. Changing the metric value to zero if the metric is too small (e.g. less than 0.1) or negative (i.e. p(n/N) is higher than the normalization factor). This zeroing forces the metric to increase monotonically and simplifies the survivor path selection.

lated with the fixed time mark sequence with no bit flipping. Step 1003 can find the log metric from Table 2 based on the match count.

Step 1004 can manage the survivors. In one embodiment, if this bit position is already a survivor, then the position can be added to the corresponding accumulator. If this position is not a survivor, and the number of survivors is less than 8, then this position can be added as a survivor and the metric recorded. If this position is not a survivor, but the number of survivors is 8, then this metric can be compared with the metrics of the existing survivors. If the metric is larger than any of them, then the survivor can be replaced with the minimum metric by this new position, and the new metric recorded. Step 1004 as described above can guarantee that the 8 survivor paths hold the 8 most likely positions based on the last extracted sequence.

Step 1005 can checking if the accumulated metric is greater than or equal to the specific threshold (described below). If yes, then step 1006 can claim that the time mark boundary is found. If not, then technique 1000 can return to step 1001 for the next extracted sequence.

The detection threshold for step 1005 should balance the detection rate and false alarm rate. That is, a higher threshold can lower the false alarm rate, but also can lower the detection rate. A system false alarm probability can be derived as follows.

For a given timeout period (timeout), the total number of observations T for each position can be represented as:

$$T = \text{round}\left(\frac{\text{timeout}}{2 \sec}\right)$$

where "round" is a round-off to whole number operation.

TABLE 2 log-metric table for coherent and differential string boundary detection (30/31/32 bits time mark sequence)

| (/30) | 21 | 22 | 23 | 24 | 25 | 26 | 27 | 28 | 29 | 30 |
|---|---|---|---|---|---|---|---|---|---|---|
| Coh | 0.12 | 0.51 | 0.97 | 1.5 | 2.12 | 2.84 | 3.67 | 4.64 | 5.8 | 7.27 |
| Diff | 0 | 0 | 0 | 0.16 | 0.82 | 1.58 | 2.46 | 3.49 | 4.72 | 6.27 |
| (/31) | 22 | 23 | 24 | 25 | 26 | 27 | 28 | 29 | 30 | 31 |
| Coh | 0.27 | 0.68 | 1.16 | 1.71 | 2.34 | 3.08 | 3.92 | 4.91 | 6.08 | 7.57 |
| Diff | 0 | 0 | 0 | 0.25 | 1.02 | 1.8 | 2.69 | 3.73 | 4.97 | 6.53 |
| (/32) | 23 | 24 | 25 | 26 | 27 | 28 | 29 | 30 | 31 | 32 |
| Coh | 0.43 | 0.85 | 1.35 | 1.92 | 2.57 | 3.32 | 4.18 | 5.18 | 6.37 | 7.88 |
|  | 0 | 0 | 0 | 0.54 | 1.23 | 2.02 | 2.93 | 3.98 | 5.22 | 6.8 |

In one embodiment, 8 survivor paths can be used to reduce complexity. Notably, the performance loss of using 8 survivor paths is less than 0.1 dB compared to using all 200 survivor paths.

Figure 10:
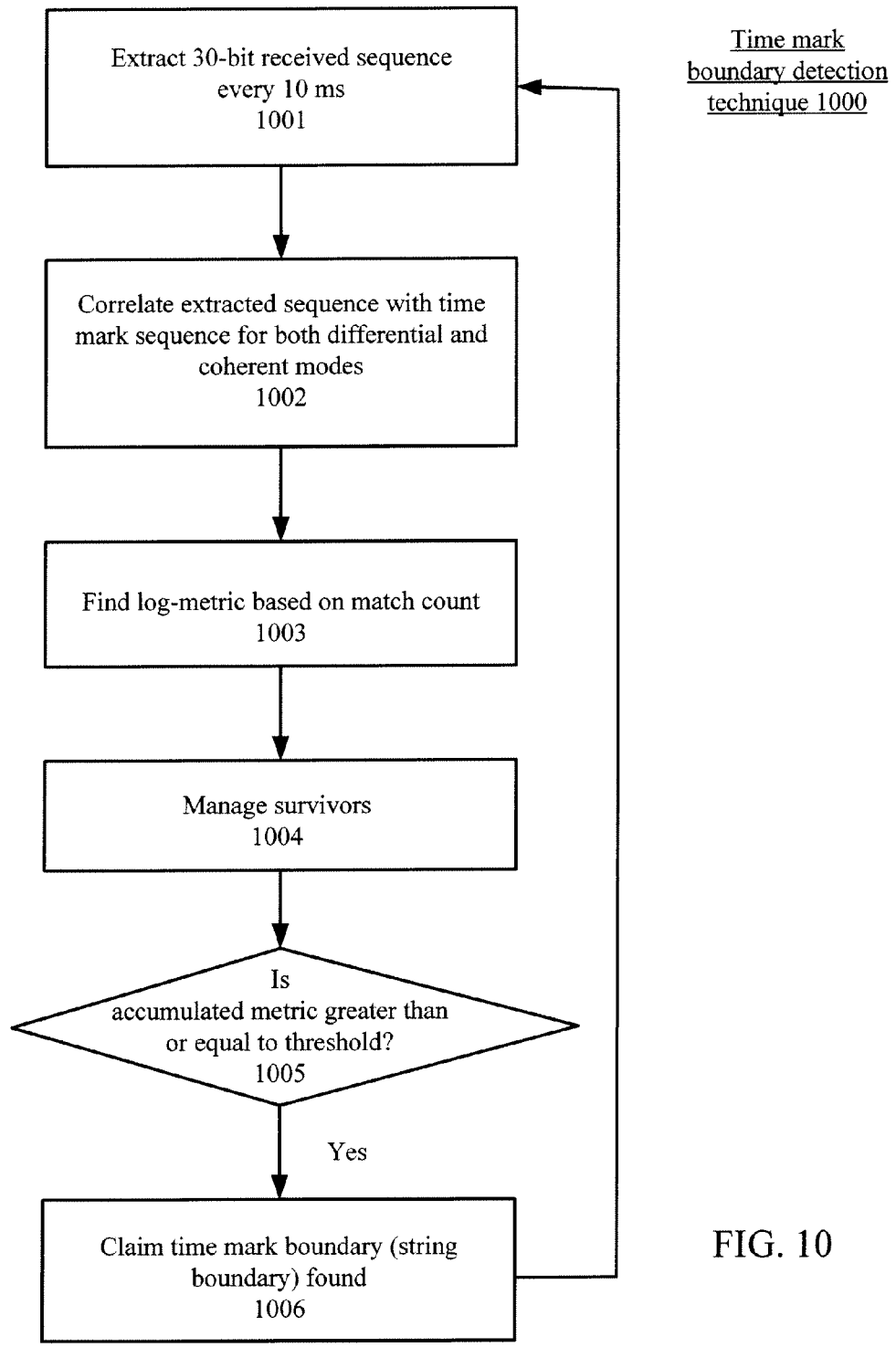
FIG. 10 illustrates an exemplary time mark boundary detection technique that can use a soft search scheme with a limited number of survivor paths.

FIG. 10 illustrates an exemplary time mark boundary detection technique 1000 that can use a soft search scheme with 8 survivor paths. In step 1001, a 30-bit received sequence can be extracted (occurs every 10 ms). In step 1002, the extracted sequence can be correlated with the time mark sequence. For the differential mode, 30 bit-flipped sequences can be tried, where the n-th sequence has bit[n:29] flipped, and the maximum match count can be recorded. For the coherent mode, the extracted sequence can be simply corre- Let $k_n$ be the number of observations out of the T observations that have n-bit errors. For N-bit correlation, $0 \le n \le N$ and $$\sum_{n=0}^{N} k_n = T.$$

For simplicity, only $0 \le n \le N_e$ is considered, i.e. correlations with more than $N_e$ bit errors are ignored. This simplification is reasonable because a large number of bit errors indicates poor matching and does not increase the chance of time mark detection.

Note that $$\sum_{n=0}^{N} k_n \le T$$

For example, T=15, $k_0$=2, $k_1$=1, $k_2$~$k_{Ne}$=0 means out of 15 observations, there are 2 observations with no bit error, 1 observation with 1 bit error, 0 observations with 2~$N_e$ bit errors, and 15−2−1=12 observations with more than $N_e$ bit errors.

The probability of having an outcome of $k_0, k_1, k_2, \ldots, k_{Ne}$ after T observations is:

$$P(k_0, k_1, k_2, \ldots, k_{Ne}) = C_T^{k_0} P(N/N)^{k_0} \cdot$$

$$C_{T-k_0}^{k_1} P((N-1)/N)^{k_1} \ldots$$

$$C_{T-k_0-k_1-\ldots-k_{Ne-1}}^{k_{Ne}} P((N-N_e)/N)^{k_{Ne}}$$

$$= T! \prod_{n=0}^{Ne} \frac{P(n/N)^{k_n}}{(k_n!)}$$

wherein $C_M^m$ is the binomial coefficient of M-choose-m, defined as $$C_M^m = \frac{m!}{m!(M-m)!},$$

and P(n/N) is the probability of having n bit matches (i.e. N−n bit errors) in an N-bit correlation that was previously derived.

False time mark detection occurs for a position if the sum of scores is greater than the score threshold. The score of having n bit errors, Lp(n), is given in Table 6-2. The sum of scores for the outcome of $k_0, k_1, k_2, \ldots, k_N$ is:

$$\text{sum\_score} = \sum_{n=0}^{Ne} Lp(n) \cdot k_n$$

Let S be the set of all possible outcomes that exceeds the score threshold:

$$S = \left\{ (k_0, k_1, k_2, \ldots, k_{Ne}), \text{ where } \sum_{n=0}^{Ne} Lp(n) \cdot k_n > \text{score\_thr} \right\}$$

Then the false alarm probability of one position can be written as:

$$P_f = P(\text{sum\_score} > \text{score\_thr})$$

$$= \sum_{k_0, k_1, k_2, \ldots, k_{Ne} \in S} P(k_0, k_1, k_2, \ldots, k_{Ne})$$

$$= \sum_{k_0, k_1, k_2, \ldots, k_{Ne} \in S} T! \prod_{n=0}^{Ne} \frac{P(n/N)^{k_n}}{(k_n!)}$$

After getting the false alarm probability of one position, the system false alarm probability can be obtained by multiplying 100 and 200 for with and without 20 ms bit boundary assistance, respectively. That is, $$P_f \text{total} = P_f \times 100 \text{ or } 200$$

Figure 11:
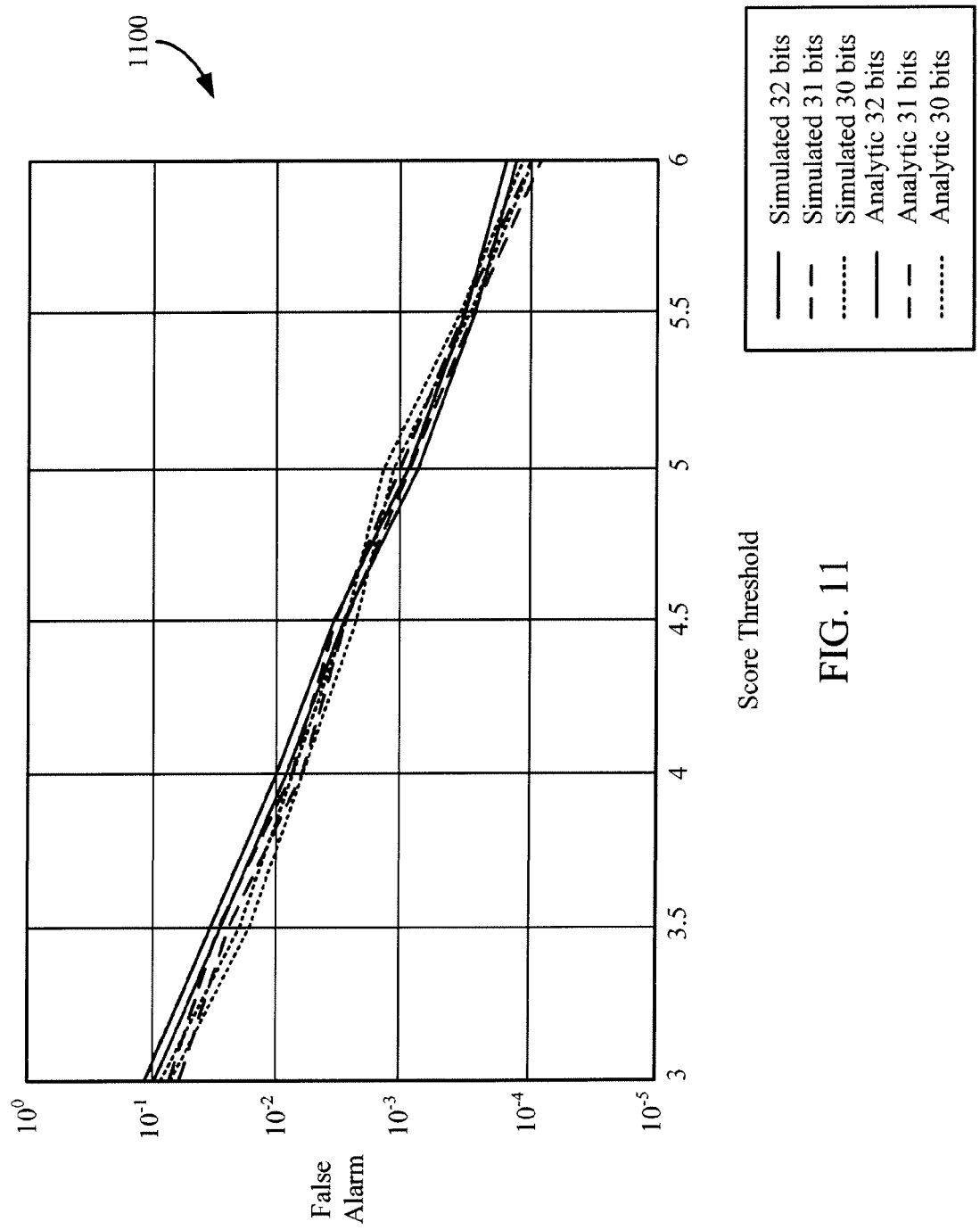
FIGS. 11 and 12 illustrate graphs that plot score threshold versus false alarm for coherent and differential bit boundary detection.
Figure 12:
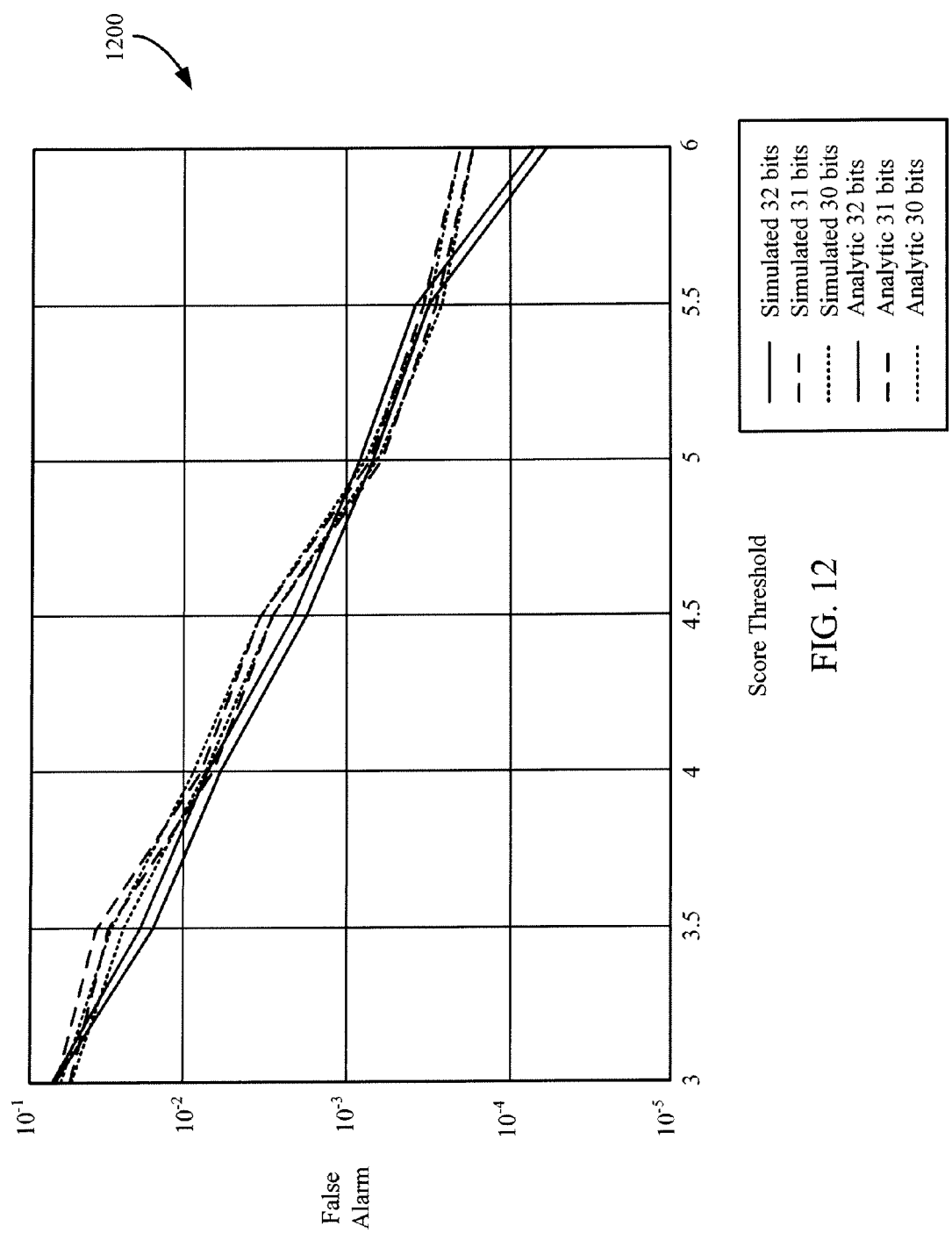

FIGS. 11 and 12 illustrate graphs that plot score threshold versus false alarm for coherent and differential bit boundary detection. Specifically, FIG. 11 illustrates a graph 1100 showing exemplary coherent score thresholds given a 30 sec. timeout (N=30, 31, and 32 bits, with random 10 ms bits and 20 ms boundary assistance (described below)). FIG. 12 illustrates a graph 1200 showing exemplary differential score thresholds given a 30 sec timeout (N=30, 31, and 32 bits, with random 10 ms bits and 20 ms boundary assistance (described below)). FIGS. 11 and 12 show that the analytic and simulated results are very similar for all cases of N.

Table 3 shows the thresholds for a target false alarm rate of 1e-3/1e-4 and a 30 sec timeout (chosen from FIGS. 11 and 12). The above-described method can advantageously provide a false alarm rate less than the target within the specified timeout period. The worst case occurs in relatively low CNo.

TABLE 3

| | Detection threshold for Pfa = 1e-3/1e-4 w/time out of 30 seconds | | | |
|---|---|---|---|---|
| With timeout of 30 sec | Pfa = 1e-3 w/10 ms bit info | Pfa = 1e-3 w/20 ms bit info | Pfa = 1e-4 w/10 ms bit info | Pfa = 1e-3 w/20 ms bit info |
| Coherent | 5.4 | 5.1 | 6.4 | 6.1 |
| Differential | 5.1 | 4.8 | 6.2 | 5.9 |

In one embodiment, 20 ms bit boundary assistance can also be provided for time mark boundary detection (which as discussed above uses 10 ms bit sync). This 20 ms bit boundary detection can be run in parallel with time mark detection. Notably, after a 20 ms bit sync is found, (1) the AFC (automatic frequency control) tracking error will be reduced, which improves the sensitivity of the time mark detection; (2) only 100 positions need to be tried for time mark detection, which reduces the false alarm rate. The algorithm for the 20 ms bit boundary detection is discussed in U.S. patent application Ser. No. 12/870,533, entitled "GLONASS BIT BOUNDARY DETECTION", which was filed on Aug. 27, 2010, by Atheros Communications, Inc., and which is incorporated by reference herein.

By using 20 ms bit boundary assistance, the performance of the GLONASS receiver may be improved by 0.1~0.4 dB and 0.7~1.0 dB for coherent and differential modes, respectively. The larger gain for the differential mode may be due to the reduction of the frequency tracking error. The coherent mode may not get this benefit because the frequency fluctuation may already be reduced (e.g. due to a phase-locked loop (PLL)).

Figure 13:
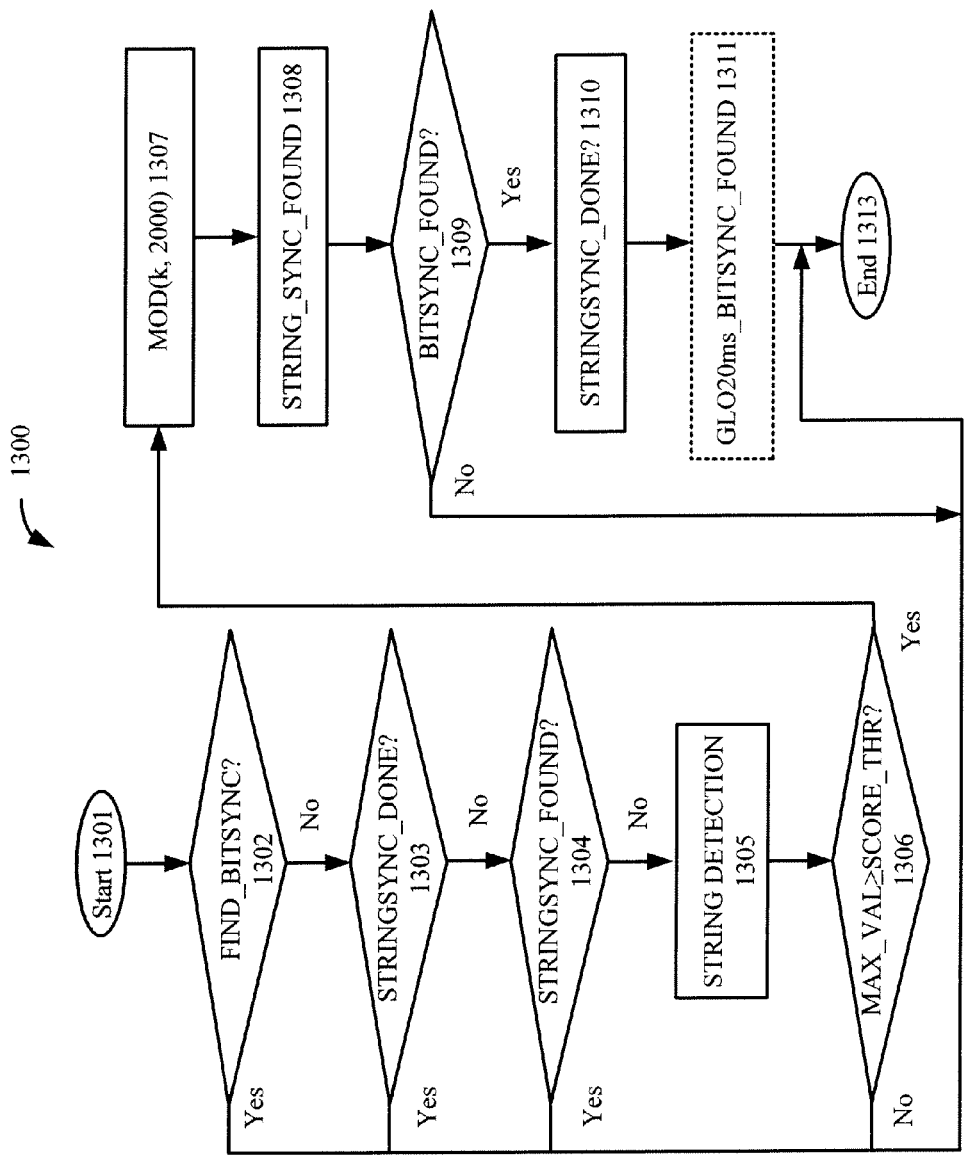
FIG. 13 illustrates a flow chart that summaries a time mark detection technique.

FIG. 13 illustrates a flow chart that summaries a time mark detection technique 1300. After starting in step 1301, step 1302 determines whether the 10 ms bit sync is found (FIND_BITSYNC). If not, then step 1303 determines whether a string synchronization is found and verified (STRINGSYNC_DONE). If not, then step 1304 determines whether string synchronization is at least found (STRINGSYNC_FOUND). If not, then step 1305 performs string boundary detection as described above. If the maximum valid score among all survivor paths is greater than or equal to the score threshold as defined in Table 3 (MAX_VAL≥SCORE_THR), then step 1307 performs the modular arithmetic to find the index of the string boundary within the 2 sec interval.

Based on MOD(k,2000), a string sync can be found in step 1308. Step 1309 determines whether a bit sync is found. If so, then step 1310 can verify the string sync and step 1311 can find the 20 ms bit sync (optional). Technique 1300 ends at step 1313. In summary, technique 1300 starts time mark detection only after the 10 ms bit boundary is detected, and completes time mark detection after the 10 ms bit sync is verified. Optionally, the 20 ms bit boundary information can be updated after time mark detection.

Figure 14A:
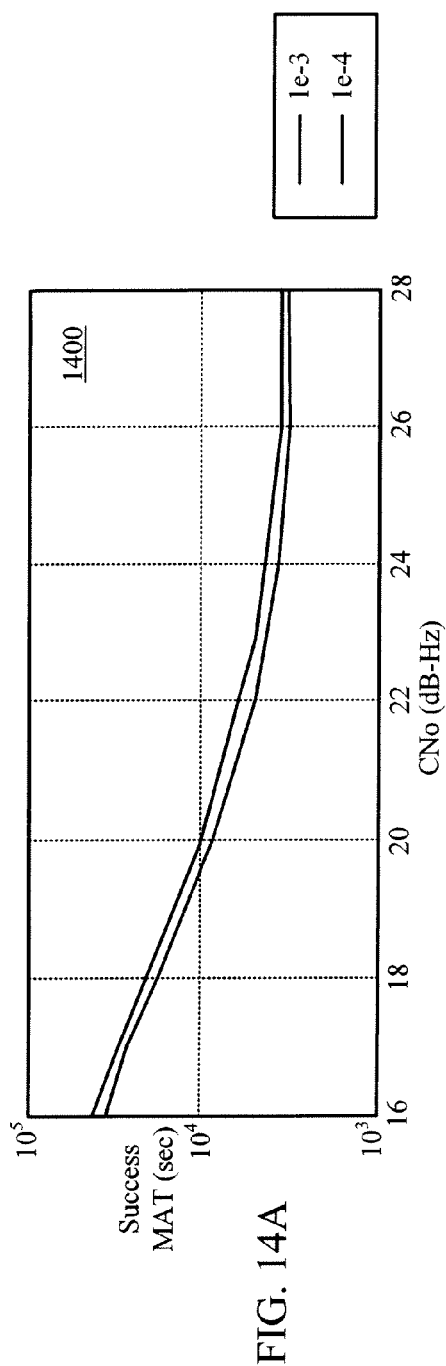
FIGS. 14A and 14B compare different detection thresholds, i.e. 1e-3 and 1e-4, with 20 ms bit boundary assistance in the coherent mode.
Figure 14B:
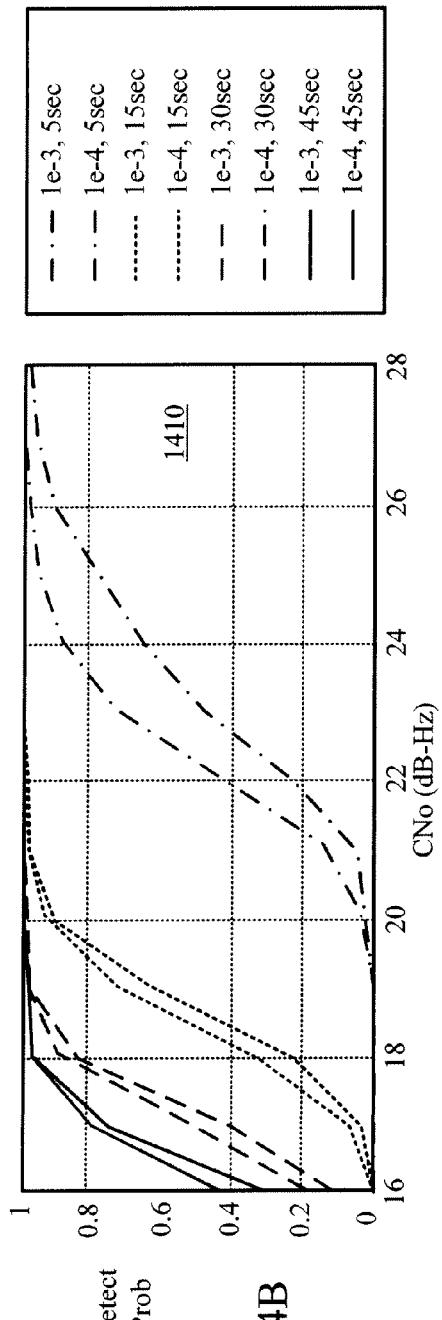

FIGS. 14A and 14B compare different detection thresholds, i.e. 1e-3 and 1e-4, with 20 ms bit boundary assistance in the coherent mode. Specifically, FIG. 14A illustrates a graph 1400 that plots success MAT (sec) versus channel to noise (SNR)(dB-Hz) for 1e-3 and 1e-4 detection thresholds. FIG. 14B illustrates a graph 1410 that plots the detection probability versus channel to noise for 1e-3 and 1e-4 detection thresholds at various timeouts (5, 15, 30, and 45 sec).

Figure 15A:
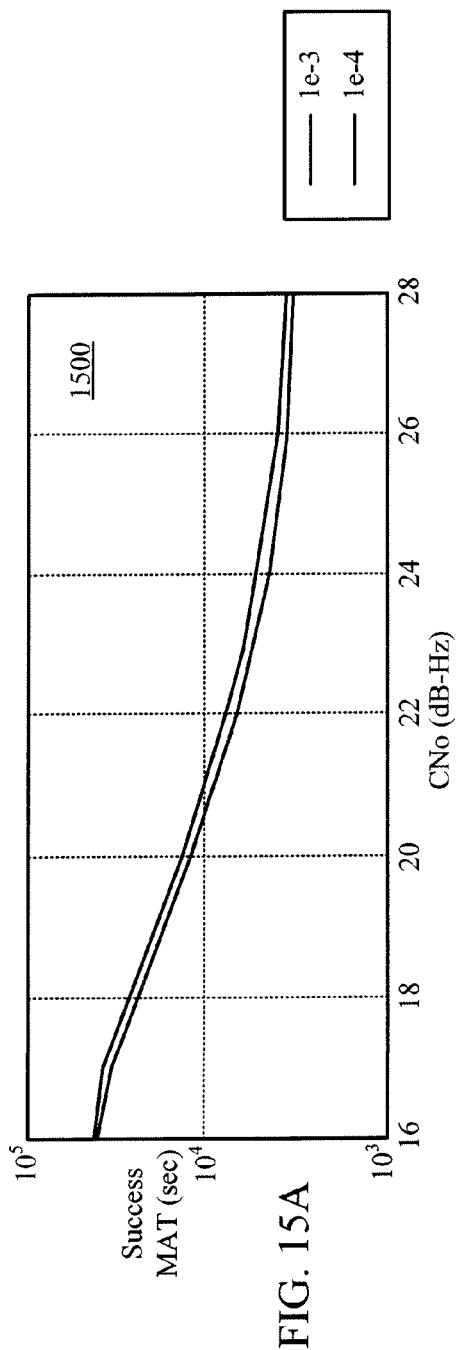
FIGS. 15A and 15B compare different detection thresholds, i.e. 1e-3 and 1e-4, with 20 ms bit boundary assistance in the differential mode.
Figure 15B:
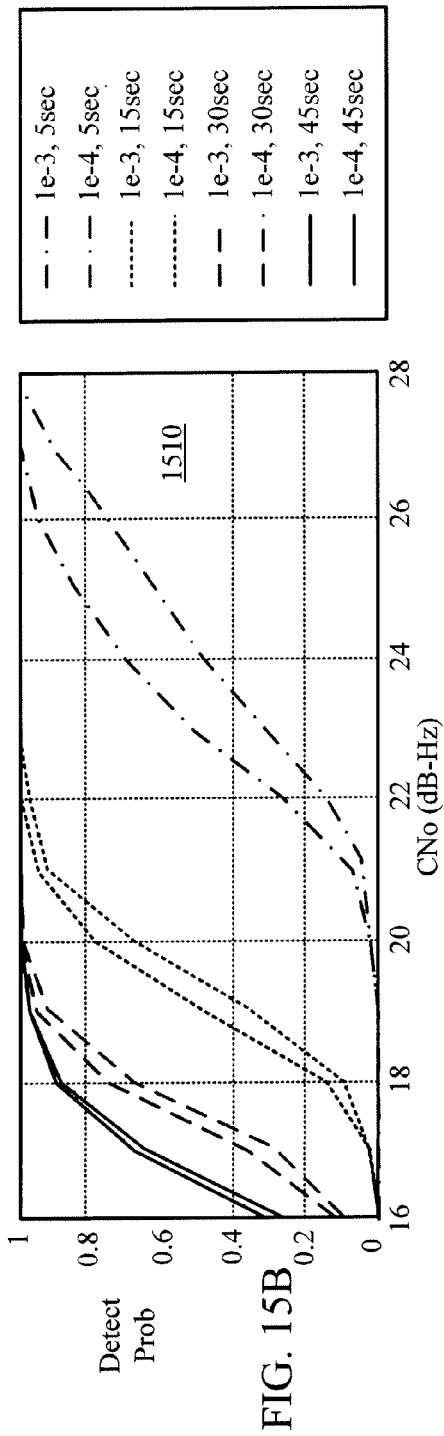

FIGS. 15A and 15B compare different detection thresholds, i.e. 1e-3 and 1e-4, with 20 ms bit boundary assistance in the differential mode. Specifically, FIG. 15A illustrates a graph 1500 that plots success MAT (sec) versus channel to noise (SNR)(dB-Hz) for 1e-3 and 1e-4 detection thresholds. FIG. 15B illustrates a graph 1510 that plots the detection probability versus channel to noise for 1e-3 and 1e-4 detection thresholds at various timeouts (5, 15, 30, and 45 sec).

From FIGS. 14A, 14B, 15A, and 15B, it can be seen that a higher detection threshold associated with a lower false alarm rate causes some performance degradation for the shortest timeout, such as for the 5 sec timeout. In one embodiment, to balance detection time and false alarm rate across a wide SNR range, multiple thresholds can be used, where the threshold changes with estimation time T. For example, when T<5 sec, the lower threshold of THR(Pfa 1 e-3) can be used; when T is large, the higher threshold of THR(Pfa 1 e-4) can be used.

Figures 16A, 16B:
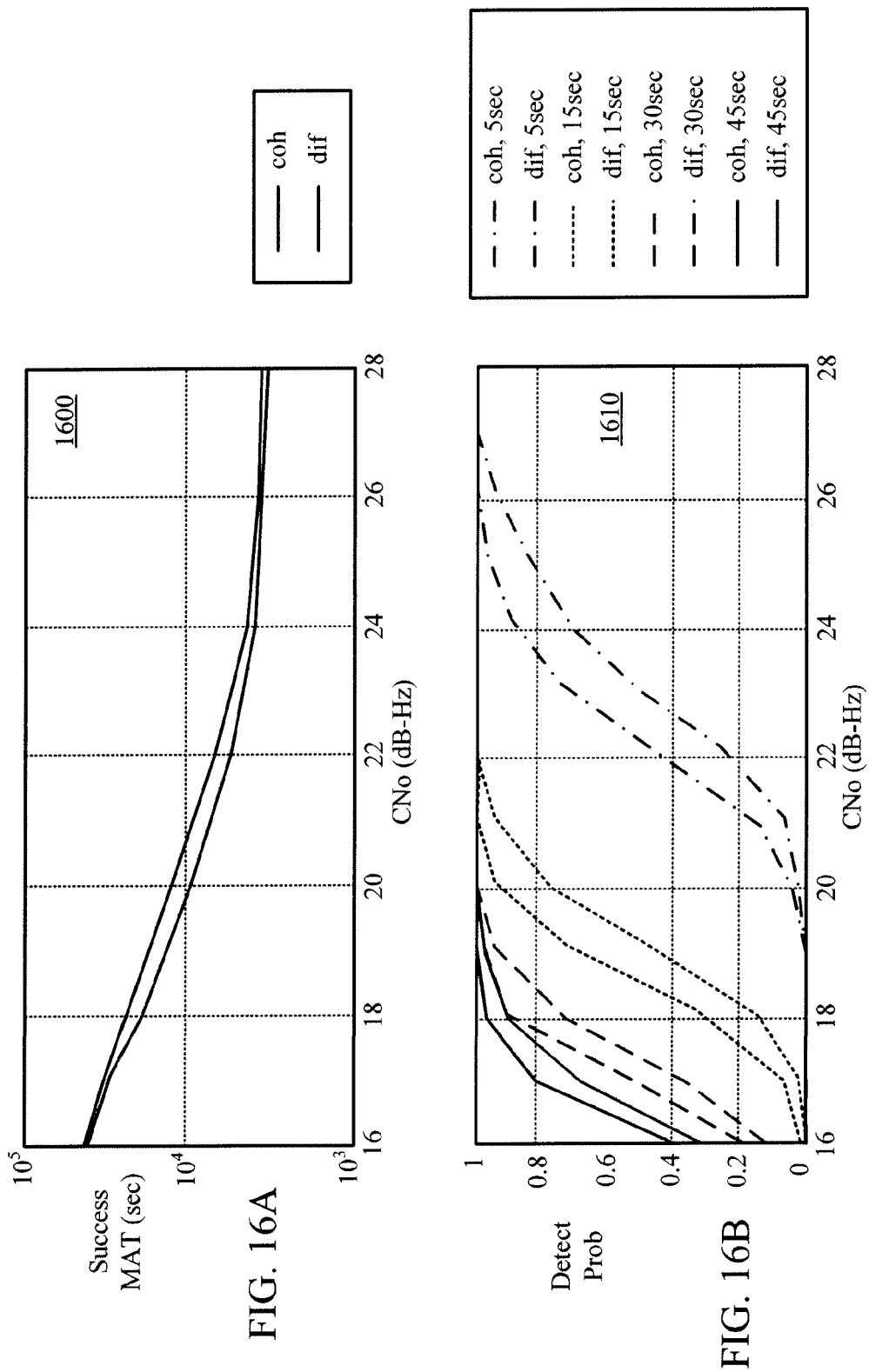
FIGS. 16A and 16B compare the time mark performance for the coherent mode versus the differential mode with 20 ms bit boundary assistance.

FIGS. 16A and 16B compare the time mark performance for the coherent mode versus the differential mode with 20 ms bit boundary assistance (false alarm rate=zero). Specifically, FIG. 16A illustrates a graph 1600 that plots success MAT (sec) versus channel to noise (SNR)(dB-Hz) for coherent and differential modes. FIG. 16B illustrates a graph 1610 that plots the detection probability versus channel to noise for the coherent and differential modes at various timeouts (5, 15, 30, and 45 sec).

Figure 17A:
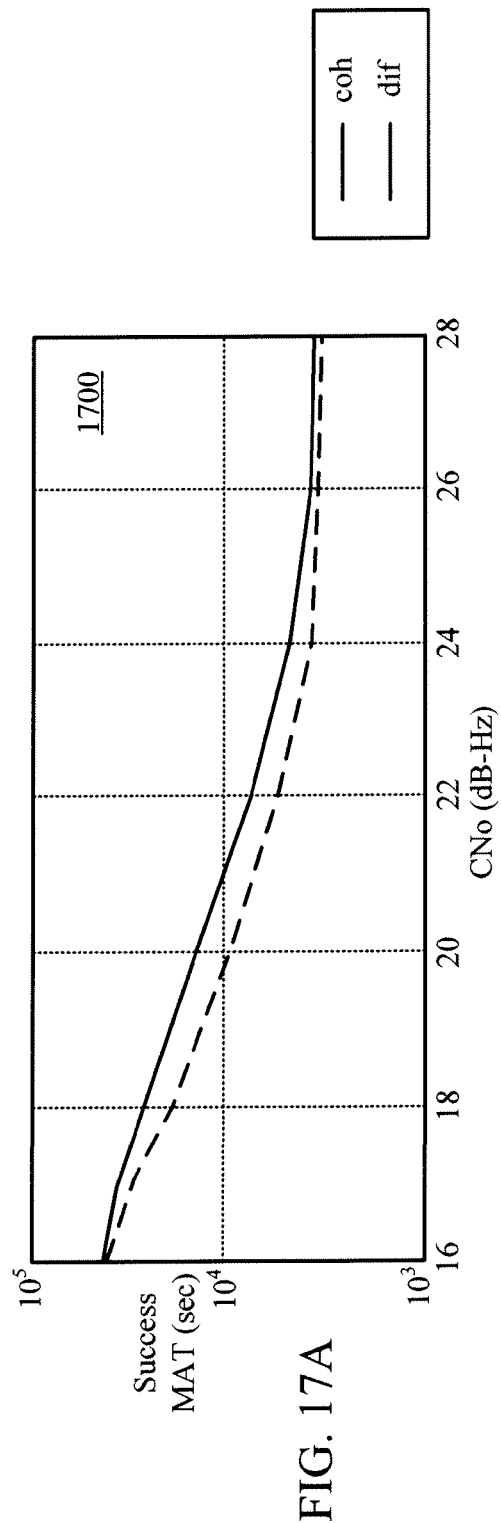
FIGS. 17A and 17B compare the time mark performance for the coherent mode versus the differential mode without 20 ms bit boundary assistance.
Figure 17B:
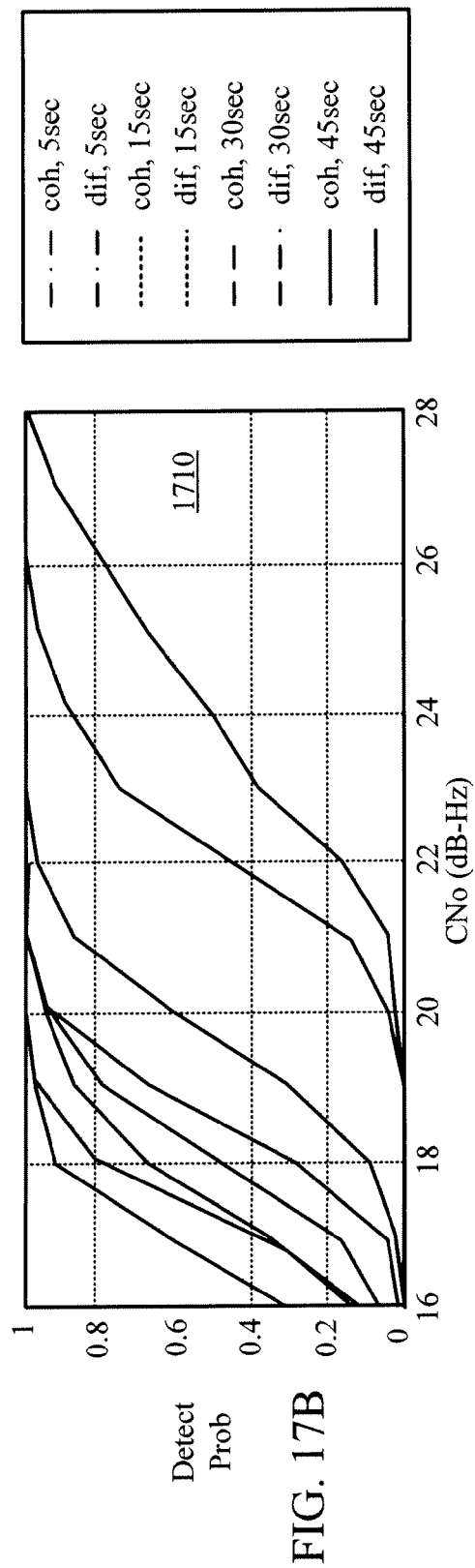

FIGS. 17A and 17B compare the time mark performance for the coherent mode versus the differential mode without 20 ms bit boundary assistance (false alarm rate=zero). Specifically, FIG. 17A illustrates a graph 1700 that plots success MAT (sec) versus channel to noise (SNR)(dB-Hz) for coherent and differential modes. FIG. 17B illustrates a graph 1710 that plots the detection probability versus channel to noise for the coherent and differential modes at various timeouts (5, 15, 30, and 45 sec).

From FIGS. 16A, 16B, 17A, and 17B, it can be seen that the time mark detection performance for the coherent mode is better than for the differential mode. Specifically, the gap between modes is approximately 0.4~0.8 dB with 20 ms boundary assistance and approximately 1~1.5 dB without 20 ms boundary assistance.

Note that the above techniques have assumed ideal 10 ms bit boundary detection for time mark detection. To evaluate the impact of false 10 ms bit sync on time mark detection, a loose threshold for the 10 ms bit sync can be intentionally chosen to create many 10 ms bit sync false detections in a simulation. Table 4 shows the breakdown of the resulting events for the following simulation conditions: T=1, thr=11/ 16, 10 ms bit sync verification stage included, no reset of time mark soft metric values if mismatch between first bit sync detection and verification, THR(Pfa=1e-3) for time mark detection, 10000 runs, and CNo=17 dB-Hz.

TABLE 4

Analysis of the impact of false 10 ms bit boundary detection

| Event | Bit sync detected | Bit sync verified | Time mark sync |
|---|---|---|---|
| False alarm rate (%) | 7 | 0.55 | 0.48 |
| % of error (±1 ms) | 88 | 96 | 88 |
| % of error (±2 ms) | 9 | 4 | 4 |
| % of error (±3 ms) | 2 | 0 | 0 |
| % of error (±4 ms) | 1 | 0 | 0 |
| % of error (±≥10 ms) | 0 | 0 | 8 |

As shown in Table 4, the bit sync false alarm rate is 7% at the first detection (higher than normal due to the loose threshold), and 0.55% after the verification. Most bit sync detection errors are within +/−2 ms at the first detection, and within +/−1 ms after verification.

The false alarm rate of time mark detection is 0.48%. Most detection errors are 1 or 2 ms, i.e. caused by 10 ms detection errors. Only 8% of the errors are larger than 10 ms, i.e. genuine time mark detection errors. Therefore, the effective false alarm rate for time mark is 0.48%*8%=4e-4.

Note that the threshold corresponding to target false alarm rate of Pfa=1e-3 was chosen, which was derived under the assumption of ideal 10 ms bit sync. This shows that the false alarm rate of time mark detection is still within the target in the presence of 10 ms bit sync errors and there is no obvious performance loss. Notably, when the bit sync error is small (1 or 2 ms), the SNR of 10 ms dumps are still acceptable and the time mark can still be detected. Moreover, when the bit sync error is large, the time mark cannot be detected and there is no false alarm.

As a result, reset time mark detection does not need to be reset when the bit sync verification fails. In one embodiment, the coarse timing from the time mark detection (multiples of 10 ms) can be retained, and the fine timing can be adjusted according to the latest 10 ms bit sync detection (0~9 ms).

Note that certain features of the present invention providing frame/string detection can be implemented with software tools. For example, in FIG. 1, tracking block 101 and I&D block 103 can be characterized as part of the an analog front end (AFE) implemented in hardware, whereas some blocks downstream from these components (e.g. bit extraction blocks 104/106 and boundary detection blocks 105/107) can be implemented in software. Similar hardware/software implementations can be used for the GLONASS string sync detection system 900 shown in FIG. 9. These software blocks can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks.

The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of providing frame synchronization for Global Positioning System (GPS) signals, the method comprising:
    performing coherent bit extraction on GPS bits, including:
        finding a first preamble of a first telemetry (TLM) word of a first GPS subframe, parity bits of the first TLM word and a first hand over word (HOW) word, a first time of week (TOW) of the first HOW word, and first subframe ID bits of the first HOW word, and
        finding a second preamble of a second TLM word of a second GPS subframe, parity bits of the second TLM word and a second HOW word of the second GPS subframe, a second TOW of the second HOW word, and second subframe ID bits of the second HOW word;
    performing coherent frame boundary detection based on bits of the coherent bit extraction, including:
        checking validity of the first TLM word using the parity bits of the first TLM word,
        checking validity of the first HOW word using the parity bits of the first HOW word,
        declaring a TOW synchronization when a valid first HOW word follows a valid first TLM word,
        checking validity of the second TLM word using the parity bits of the second TLM word,
        checking validity of the second HOW word using the parity bits of the second HOW word, and
        declaring a detected frame boundary when (1) a valid second HOW word follows a valid second TLM word, (2) the second TOW is equal to the first TOW +1, and (3) when the second subframe ID bits equal the first subframe ID bits +1;
    performing differential bit extraction on the GPS bits;
    performing differential frame boundary detection based on bits of the differential bit extraction, wherein said performing the differential frame boundary detection and said performing the coherent frame boundary detection are done concurrently; and
    providing the frame synchronization, wherein whichever of the coherent frame boundary detection and the differential frame boundary detection first finds a frame boundary, that frame boundary is used for the frame synchronization.

2. The method of claim 1, further including proceeding with said performing the coherent and the differential frame boundary detection only when two words are stored.

3. The method of claim 2, further including deleting a first-in GPS bit of the two words and adding a new GPS bit as a last-in GPS bit of the two words, and repeating said performing the coherent and the differential bit extraction on the GPS bits as well as said performing the coherent and the differential frame boundary detection.

4. A method of providing frame synchronization for GPS signals, the method comprising:
    performing coherent bit extraction on GPS bits;
    performing coherent frame boundary detection based on bits of the coherent bit extraction;
    performing differential bit extraction on the GPS bits, and finding a preamble of a telemetry (TLM) word of a GPS subframe, and a limited number of most significant bits (MSB) of a time of week (STOW) of a hand-over word (HOW) word;
    performing differential frame boundary detection based on bits of the differential bit extraction, further comprising:
        performing the differential and the coherent frame boundary detection concurrently,
        identifying the TLM word using the preamble, and saving a limited number of survivor paths, wherein survivor paths are most likely locations for the frame boundary; and
    providing the frame synchronization, wherein whichever of the coherent frame boundary detection and the differential frame boundary detection first finds the frame boundary, that frame boundary is used for the frame synchronization.

5. The method of claim 4, wherein the limited number of survivor paths is 10-12 locations out of a possible 300 locations.

6. The method of claim 4, further including performing the differential frame boundary detection using multiple TLM and HOW words and updating the survivor paths to reflect the most likely locations for the frame boundary.

7. The method of claim 6, further including adding +1 to a metric each time the TLM word is identified using the preamble.

8. The method of claim 7, further including storing a value of a last STOW, and setting a STOW flag to ON when a current STOW equals the last STOW.

9. The method of claim 8, wherein performing the differential frame boundary detection includes declaring a detected frame boundary when (1) the metric is greater than or equal to a threshold and the STOW flag is set to ON.

10. The method of claim 9, wherein the threshold is a function of time.

11. The method of claim 10, wherein the threshold is increased by "1" every 10 ms.

12. A method of providing string synchronization for GLONASS signals, the method comprising:
    performing coherent bit extraction on GLONASS bits, including extracting 30 bits every 10 ms;
    performing coherent string boundary detection based on bits of the coherent bit extraction, including correlating the 30 bits with a time mark of GLONASS without bit flipping;
    performing differential bit extraction on the GLONASS bits;
    performing differential string boundary detection based on bits of the differential bit extraction, wherein said performing the differential string boundary detection and said performing the coherent string boundary detection are done concurrently; and
    providing the string synchronization, wherein whichever of the coherent string boundary detection and the differential string boundary detection first finds a string boundary, that string boundary is used for the string synchronization.

13. The method of claim 12, wherein said performing the coherent string boundary detection further includes assigning a metric for each correlation output value.

14. The method of claim 13, wherein said performing the coherent string boundary detection further includes accumulating the metric for each bit location every 2 seconds.

15. The method of claim 14, wherein said performing the coherent string boundary detection further includes identifying a limited number of survivor paths based on highest accumulated metrics.

16. The method of claim 15, wherein the limited number of survivor paths is 8.

17. The method of claim 15, wherein said performing the coherent string boundary detection further includes updating the survivor paths as necessary for each extracted sequence.

18. The method of claim 17, wherein said performing the coherent string boundary detection further includes determining whether a set of accumulated metrics is greater than or equal to a threshold, and if so, then declaring a time mark boundary detection, wherein the time mark boundary detection provides the string synchronization.

19. A method of providing string synchronization for GLONASS signals, the method comprising:
performing coherent bit extraction on GLONASS bits;
performing coherent string boundary detection based on bits of the coherent bit extraction;
performing differential bit extraction on the GLONASS bits, including extracting 30 bits every 10 ms;
performing differential string boundary detection based on bits of the differential bit extraction, performing the differential string boundary detection and the coherent string boundary detection concurrently, and correlating the 30 bits with a time mark of GLONASS with bit flipping; and
providing the string synchronization, wherein whichever of the coherent string boundary detection and the differential string boundary detection first finds a string boundary, that string boundary is used for the string synchronization.

20. The method of claim 19, wherein said performing the differential string boundary detection further includes assigning a metric for each correlation output value.

21. The method of claim 20, wherein said performing the differential string boundary detection further includes accumulating the metric for each bit location every 2 seconds.

22. The method of claim 21, wherein said performing the differential string boundary detection further includes identifying a limited number of survivor paths based on highest accumulated metrics.

23. The method of claim 22, wherein the limited number of survivor paths is 8.

24. The method of claim 22, wherein said performing the differential string boundary detection further includes updating the survivor paths as necessary for each extracted sequence.

25. The method of claim 24, wherein said performing the differential string boundary detection further includes determining whether a set of accumulated metrics is greater than or equal to a threshold, and if so, then declaring a time mark boundary detection, wherein the time mark boundary detection provides the string synchronization.

\* \* \* \* \*